(12) United States Patent
Worley et al.

(10) Patent No.: US 7,784,063 B2
(45) Date of Patent: Aug. 24, 2010

(54) METHOD AND APPARATUS FOR SYSTEM CALLER AUTHENTICATION

(75) Inventors: John Worley, Fort Collins, CO (US); Daniel J. Magenheimer, Fort Collins, CO (US); Chris D. Hyser, Victor, NY (US); Robert D. Gardner, Fort Collins, CO (US); Thomas W. Christian, Fort Collins, CO (US); Bret McKee, Fort Collins, CO (US); Christopher Worley, Fort Collins, CO (US); William S. Worley, Jr., Aurora, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1825 days.

(21) Appl. No.: 10/867,048

(22) Filed: Jun. 14, 2004

(65) Prior Publication Data

US 2005/0166208 A1 Jul. 28, 2005

Related U.S. Application Data

(63) Continuation-in-part of application No. 10/754,184, filed on Jan. 9, 2004, now abandoned.

(51) Int. Cl.
*G06F 9/44* (2006.01)
*H04L 29/06* (2006.01)

(52) U.S. Cl. .................. 719/319; 713/166; 713/167

(58) Field of Classification Search .................. 707/9; 711/132, 152, 163, 164; 713/164–170; 714/25; 715/741–743; 717/124, 126–129; 718/102, 718/104; 719/318, 319; 726/22–30, 14
See application file for complete search history.

(56) References Cited

U.S. PATENT DOCUMENTS

| 5,121,489 | A | * | 6/1992 | Andrews | 714/38 |
| 5,991,858 | A | * | 11/1999 | Weinlander | 711/163 |
| 6,412,071 | B1 | * | 6/2002 | Hollander et al. | 726/23 |
| 6,851,108 | B1 | * | 2/2005 | Syme et al. | 717/146 |
| 6,918,126 | B1 | * | 7/2005 | Blais | 719/332 |
| 7,228,563 | B2 | * | 6/2007 | Szor | 726/22 |
| 7,509,639 | B2 | * | 3/2009 | Worley, Jr. | 718/1 |
| 2002/0194493 | A1 | * | 12/2002 | Dalton | 713/200 |
| 2003/0172109 | A1 | * | 9/2003 | Dalton et al. | 709/203 |
| 2003/0226022 | A1 | * | 12/2003 | Schmidt et al. | 713/189 |
| 2004/0105298 | A1 | * | 6/2004 | Symes | 365/149 |
| 2004/0168078 | A1 | * | 8/2004 | Brodley et al. | 713/200 |
| 2004/0221269 | A1 | * | 11/2004 | Ray et al. | 717/124 |
| 2005/0005101 | A1 | * | 1/2005 | Yenduri | 713/164 |
| 2005/0160210 | A1 | * | 7/2005 | Watt et al. | 710/269 |

* cited by examiner

*Primary Examiner*—H. S. Sough
*Assistant Examiner*—Charles E Anya

(57) ABSTRACT

In various embodiments of the present invention, execution-state transitions occur in a first portion of a system, and a cumulative execution state for each process is maintained by a second portion of the system so that, when a second-portion routine is called, the second-portion routine can determine whether or not the current execution state is suitable for execution of the second-portion routine. In various embodiments, a callpoint log, allocated and maintained for each process, stores the cumulative execution state for the process. In one embodiment, the first portion is an operating system, and the second portion is a secure kernel, with the cumulative execution state used by the secure kernel to prevent unauthorized access by erroneously or maliciously invoked operating-system routines to secure kernel routines. In another embodiment, the cumulative execution state is used as a debugging tool by the second-portion routines to catch errors in the implementation of the first-portion routines.

27 Claims, 20 Drawing Sheets

| | 708 | 712 | 710 | |
|---|---|---|---|---|
| | X | a | A | 706, 722 |
| | A | c | B | 724 |
| | B | e | A | |
| | A | f | X | |
| | X | g | B | |
| | B | i | A | |
| | A | l | B | |
| | B | m | X | |
| | B | n | C | |
| | C | p | D | |
| | D | s | C | |
| | C | u | B | |
| | C | w | E | |
| | E | y | C | |
| | C | z | F | |
| | F | z2 | C | |
| 716, 720 | A | aa | G | 718, 714 |
| | G | cc | A | |
| | G | dd | H | |
| | H | ag | G | |

Allowed Transitions Table

| | 728 | 730 | 732 | |
|---|---|---|---|---|
| K10 | q | D | C | B |
| K11 | s1 | D | C | B |
| K12 | x | E | C | B — 734, 726 |
| K12 | z1 | F | C | B |
| K13 | s2 | F | C | B |
| K14 | s3 | F | C | B |
| K15 | b | A | X | — 736 |
| K16 | ee | H | G | A |
| K16 | ff | H | G | A |

Allowed Calls Table

Figure 7

METHOD AND APPARATUS FOR SYSTEM CALLER AUTHENTICATION

CROSS-REFERENCE TO RELATED APPLICATION

This application is a continuation-in-part application of application Ser. No. 10/754,184, filed Jan. 9, 2004, now abandoned.

TECHNICAL FIELD

The present invention is related to computer operating systems and other complex software systems, and, in particular, to a method and system for monitoring access to routines within portions of a system by other routines and by external entities.

BACKGROUND OF THE INVENTION

Computer security has been an active area of research and development for many years. With an increased frequency of high-profile instances of security breaches, Internet-borne computer viruses, and other security-related attacks on previously considered to be relatively secure computer systems, computer-security issues have risen to the forefront of attention and research. Various approaches for providing greater security have been developed and proposed, including approaches relying of physical security, cryptography, authentication, secure operating systems, and increasingly capable security features embodied in underlying hardware. For example, a number of newer processors, including the Intel Itanium architecture, include architectural support for privileged levels of execution and resource access. These features allow for development of secure operating-system kernels that provide core secure services upon the foundation of which full operating systems may be developed.

Unfortunately, as quickly as methods for securing computer systems are developed, strategies for undermining and attacking those methods soon follow, both in proposals and discussions, as well as implemented, security-breaching tools, protocols, Trojan-horse code, and viruses. Moreover, there are quite often substantial costs in efficiency, added complexity, time, and money involved in applying methods devised for increasing the security of computer systems. Designers and manufacturers of secure computer systems have therefore recognized the need for efficient, inexpensive security-increasing techniques and tools that, when applied alone or in combination, significantly increase the security of computer systems without incurring large costs, inefficiencies, and delays.

SUMMARY OF THE INVENTION

In various embodiments of the present invention, execution-state transitions occur in a first portion of a system, and a cumulative execution state for each process is maintained by a second portion of the system so that, when a second-portion routine is called, the second-portion routine can determine whether or not the current execution state is suitable for execution of the second-portion routine. In various embodiments, a callpoint log, allocated and maintained for each process, stores the cumulative execution state for the process. In one embodiment, the first portion is an operating system, and the second portion is a secure kernel, with the cumulative execution state used by the secure kernel to prevent unauthorized access by erroneously or maliciously invoked operating-system routines to secure kernel routines. In another embodiment, the cumulative execution state is used as a debugging tool by the second-portion routines to catch errors in the implementation of the first-portion routines.

BRIEF DESCRIPTION OF THE DRAWINGS

FIG. 7 illustrates the allowed-transitions table and the allowed-calls table used in one embodiment of the present invention.

DETAILED DESCRIPTION OF THE INVENTION

Disclosed embodiments of the present invention are related to operating-system security issues, although much more general applications are possible. The present invention involves relatively efficient and unobtrusive techniques for authenticating callers of software routines in order to prevent access to those routines by unauthorized processing entities. The described embodiment involves protecting access to secure-kernel routines from unsecure or less secure operating-system code and by external entities.

In one embodiment of the present invention, a callpoint log, an allowed-transitions table, and an allowed-calls table are added to a first, more secure portion of an operating system or other computer system. The callpoint log, allowed-transitions table, and allowed-calls table may all be protected from unauthorized access, particularly write access by less secure processing entities. Unsecure or less secure portions of an operating system or other computer system can then be modified to include calls to transition and untransition secure-kernel routines in order to establish cumulative state information at various points in the unsecure and less secure operating system or other computer system. The cumulative states for each processing entity are stored in callpoint log associated with, and allocated for, that processing entity. Secure-kernel routines, upon invocation, can access the callpoint log, and can compare the cumulative state residing in the callpoint log to entries in the allowed-calls table in order to determine whether or not the processing entity calling the secure-kernel routine is authorized to do so. Moreover, the transition and untransition routines, upon entry, can determine, based on the contents of the allowed-transitions table, whether or not the transition specified by the calling process should or should not be allowed. The callpoint log, allowed-transitions table, and allowed-calls table may be cryptographically secured to prevent unauthorized access, and separately authenticated to prevent unauthorized modification, by any processing entity executing at less than the most privileged processing levels. The allowed-transitions-table and allowed-calls-table entries include authorized resumption points by which secure-kernel transition, untransition, and cumulative-status-checking routines can determine that control is being returned to known locations within the unsecure or less secure operating system or other computer system, preventing an inadvertently erroneous or malicious routine from directly calling secure routines with return of control from the secure routines directly to the inadvertently erroneous or malicious routine.

Figure 1:
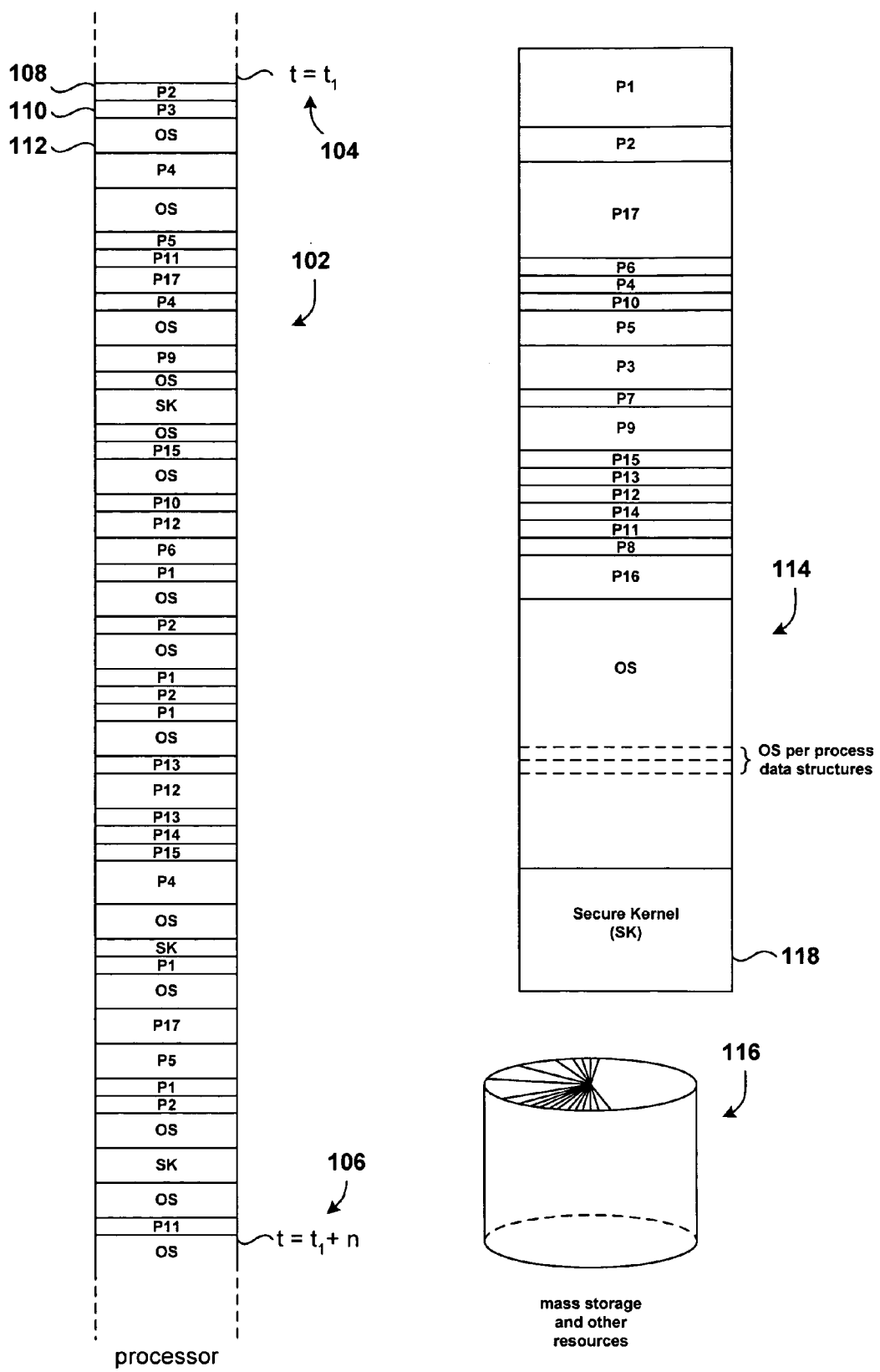
FIG. 1 is an abstract representation of partitioning of resources within a computer system between a secure kernel, non-secure-kernel portions of an operating system, and user and other processing entities.

FIG. 1 is an abstract representation of partitioning of resources within a computer system between a secure kernel, non-secure-kernel portions of an operating system, and users and other processing entities. In FIG. 1, control of a processor within the computer system is represented along a timeline 102, beginning at a first time $t=t_1$ 104 through a subsequent time $t=t_1+n$ 106. In this time interval, the processor is first used by a processing entity "P2" 108, next used by processing entity "P3" 110, and next used by the operating system 112. Subsequent time slices in the time interval are also shown, in FIG. 1, to be allocated to various other processing entities, the operating system ("OS"), and a secure kernel ("SK"). Thus, the processing resource or resources of a computer system are allocated in small increments of processing time to various processes running within the computer system. Similarly, the memory 114 within a computer system may be partitioned and allocated to various processing entities, the OS, and the SK. Likewise, mass storage space 116 and other computer resources may be physically and temporally allocated to various processes, the OS, and the SK. The memory 114 and mass storage are examples of computer readable media. In certain secure-computing environments, memory allocated to the SK 118 is strongly protected from access by processing entities executing at privilege levels below the minimal secure-kernel privilege level, and transition from a less than secure-kernel privilege level to a minimal secure-kernel privilege level can only occur at a relatively few, tightly controlled places within the operating-system code. The secure kernel includes core routines that manipulate secure memory and secure computer resources and that provide functionality that, if accessed by less than secure processing entities, would allow the less than secure processing entities to obtain secure information that they are not authorized to obtain, to interfere with other processing entities, and to manipulate and corrupt the computer system and associated resources. An operating system may be built upon the secure kernel to provide a computing environment for all other processing entities that run within the computer system.

Figure 2:
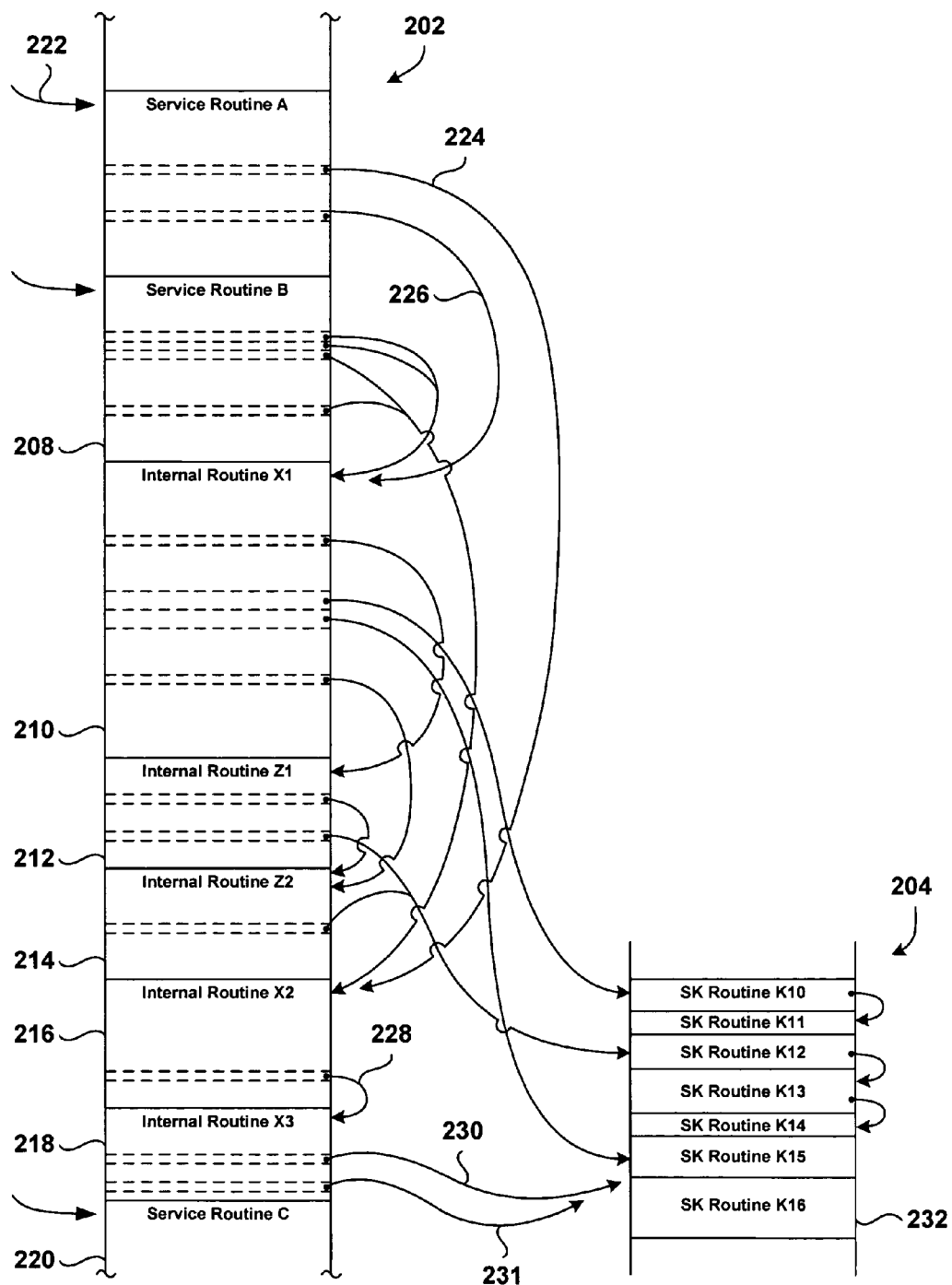
FIG. 2 illustrates a small portion of a hypothetical operating-system and secure-kernel routine layout and calling sequence pattern.

FIG. 2 illustrates a small portion of hypothetical operating-system and secure-kernel routine layout and calling-sequence pattern. In FIG. 2, a small number of operating system routines 202 are shown laid out in memory. A number of secure-kernel routines 204 called by the operating-system routines are laid out in a different, and more securely protected, portion of memory. The operating system routines include service routine A 206, service routine B 208, internal routine X1 210, internal routine Z1 212, internal routine Z2 214, internal routine X2 216, internal routine X3 218, and service routine C 220. The service routines A, B, and C represent entry-point routines of the operating system, either directly called by processing entities, or invoked during interruption handling. The service routines A, B, C, in turn, call the various internal routines, which may, in turn, call additional internal routines. Any of the operating-system routines may also call secure-kernel routines. Thus, for example, an external processing entity may call service routine A, represented by arrow 222 in FIG. 2, which, in turn, calls internal routine X2 224 and internal routine X1 226. Internal routine X2 calls internal routine X3 228, which, in turn, makes several calls 230-231 to the secure-kernel routine K16 232. In FIG. 2, and in subsequent figures, the operating-system routines are laid out in contiguous blocks of memory, are entered at the initial instructions of the routine, and may include calls to either internal operating-system routines or to secure-kernel routines. An actual operating system may contain thousands or tens of thousands of routines. FIG. 2 is meant only to serve as the basis for the following discussion, and not to in any way represent an actual operating system.

Figure 3:
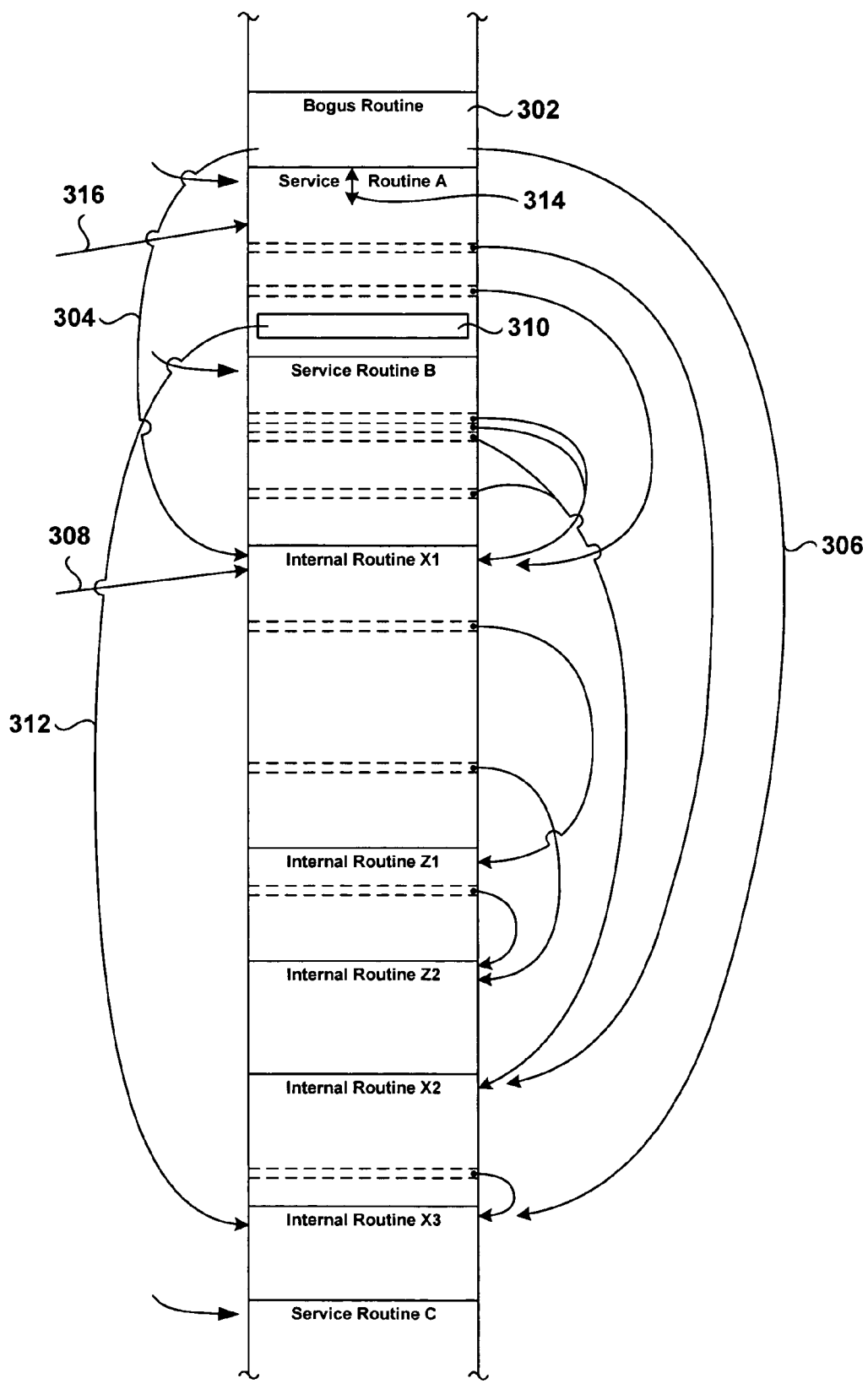
FIG. 3 illustrates various different approaches to circumventing security mechanisms built into routines within an operating system.

If the operating-system routines within a computer system can be guaranteed to be incorruptible and accessible only to well-known entry points, then securing the operating system from malicious attacks or inadvertently damaging usage by external processing entities is at least theoretically possible. Unfortunately, as has been demonstrated by many recent, high-profile security breaches, protecting an operating system from intentional or inadvertent corruption and misuse is difficult. FIG. 3 illustrates various different approaches to circumventing security mechanisms built into routines within an operating system. For example, an unauthorized, Trojan-horse routine 302 may be inserted into memory, either onto a free space or overlying an operating-system routine, to facilitate access to other operating-systems and secure-kernel routines. The Trojan-horse routine 302 in FIG. 3 makes calls to internal routines X1 304 and internal routine X3 306. As another example, external processing entities may attempt to directly call internal routines, such as a direct, external call 308 to internal routine X1, shown in FIG. 3. Intentional corruption or inadvertent corruption of an operating system routine 310 may result in unplanned calls to other operating-system or secure-kernel routines, such as the call 312 to internal routine X3. External processing entities may attempt to execute portions of an operating-system routine beyond initial authorization and authentication code 314, as represented by the direct call 316 to a portion of service routine A following an authentication and authorization portion 314 of service routine A. A malicious user may insert code into a program that causes a buffer allocated in a stack to overflow, corrupting the stack and resulting in unpredictable behavior.

More sophisticated malicious users may manipulate buffer overflow to insert a return pointer into the stack different from the return pointer that was initially inserted when the current function call was invoked, resulting in transfer of execution to a routine or function other than the calling routine or function. Buffer overflow attacks may thus be used by malicious users to gain entry into protected code. Therefore, although an operating system may be carefully designed with discrete, well-characterized entry points and a rational internal-routine calling strategy, many approaches to thwarting that design are possible.

Figure 4:
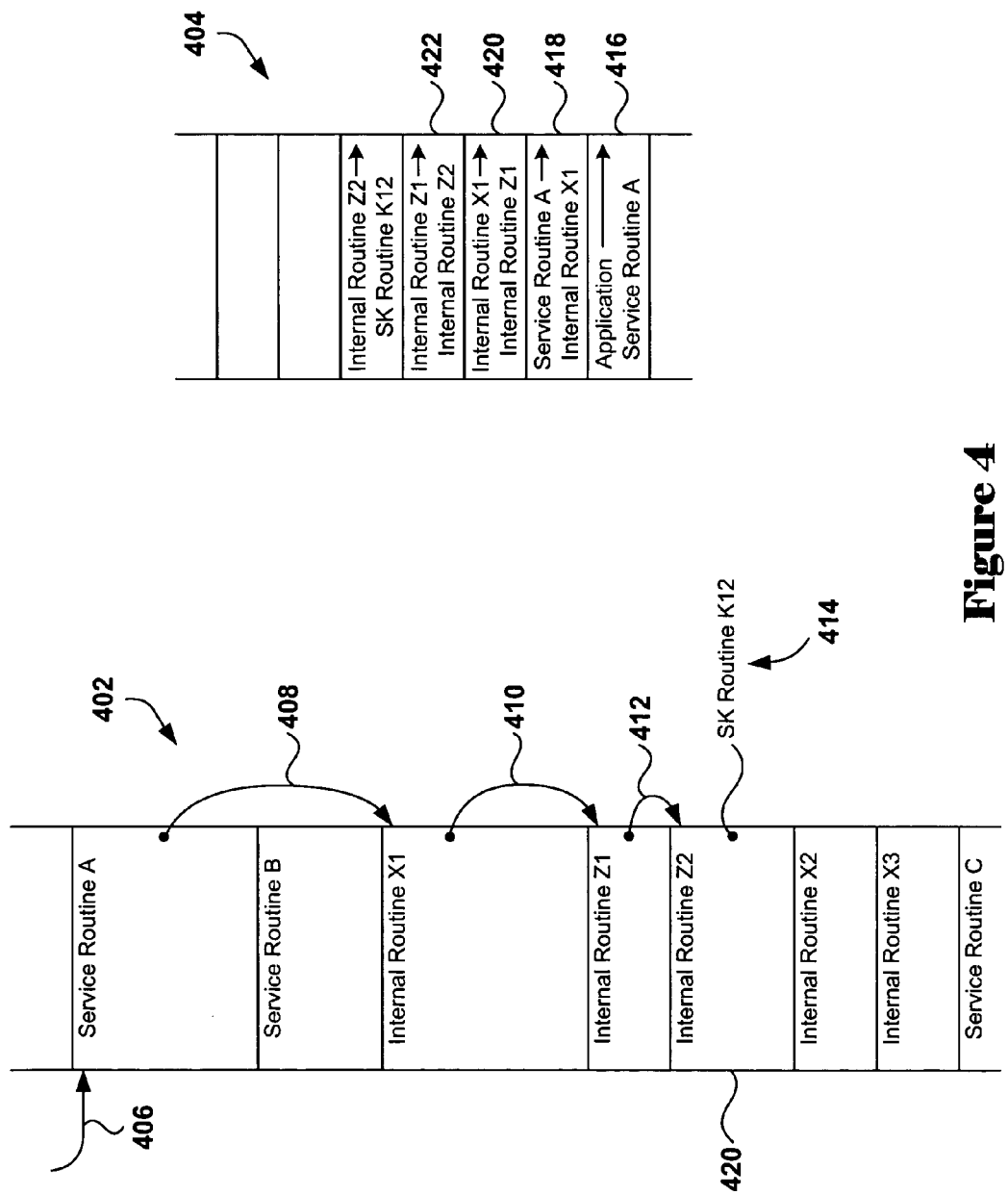
FIG. 4 illustrates one technique that may be employed to prevent many types of inadvertent and intentional attacks on the security of an operating system.

FIG. 4 illustrates one technique that may be employed to prevent many types of inadvertent and intentional attacks on the security of an operating system. In FIG. 4, the operating-system-routine example of FIGS. 2-3 is used, along with a secure memory stack 404 managed by the secure kernel or by another secure entity within the computer system. As shown in FIG. 4, a processing entity external to the operating system invokes 406 service routine A, which, in turn, invokes 408 internal routine X1. Internal routine X1 then invokes 410 internal routine Z1, which, in turn invokes internal routine Z2 412, which, finally, invokes the secure-kernel routine K12 414. Each time a routine is invoked, a call-point entry, such as call-point entry 416, is pushed onto the memory stack, referred to as a "call-point stack." When the processing entity external to the operating system calls 406 service routine A, entry 416 is pushed onto an empty call point stack. When service routine A 408 calls internal routine X1, entry 418 is pushed onto the call point stack containing the single entry 416. The call point stack grows in proportion to the number of nested internal operating-system routine calls. Upon entry into any particular internal operating-system routine or secure-kernel routine, the calling entity may be authenticated and authorized, and, in addition, the internal operating-system routine or secure-kernel routine may inspect the entries on the call point stack to ensure that a well-known sequence of nested internal calls has led to the current call of the internal operating-system routine or secure-kernel routine.

This authorization method, shown in FIG. 4, can thwart many of the different types of intentional or inadvertent attacks to computer security. This method ensures that a proper sequence of internal calls needs to be made during each possible traversal of internal operating-system routines. Thus, for example, a processing entity external to the operating system may not directly call operating-system routine Z2 420, because the call point stack would include only a single entry indicating the direct call, while the internal operating system routine Z2 needs to find entries 416-422 in the order shown in FIG. 4. Of course, a processing entity with write access to the operating system code designed by an individual intimately familiar with that code might circumvent the security technique shown in FIG. 4, but such well-informed, inside attacks represent only a tiny fraction of the potential security breaches.

The method illustrated in FIG. 4, however, suffers from a number of deficiencies. First, as the nesting of internal routine call deepens, the number of entries on the calling stack increase, leading to more and more expensive checking with increasing call depth. Such increased checking with increasing nested call depth is inversely related to the size of, and frequency at which routines called at deeper levels of nesting execute. In general, the lower level, most deeply nested routines need to be extremely efficient, as they represent core, fundamental operations that are frequently called by higher-level routines. Moreover, any particular internal operating-system routine may be invoked by many different call sequences, requiring a large database of expected, or authorized, call sequences to be maintained, against which the instantaneous contents of the call-point stack may be checked at the beginning of each operating-system routine. Database operations of this type, even for a simple file-based or memory-based database, would represent an almost certainly intolerable decrease in computation efficiency. Therefore, a more computationally efficient method for authorizing operating-system and secure-kernel routine calls is needed.

Figure 5:
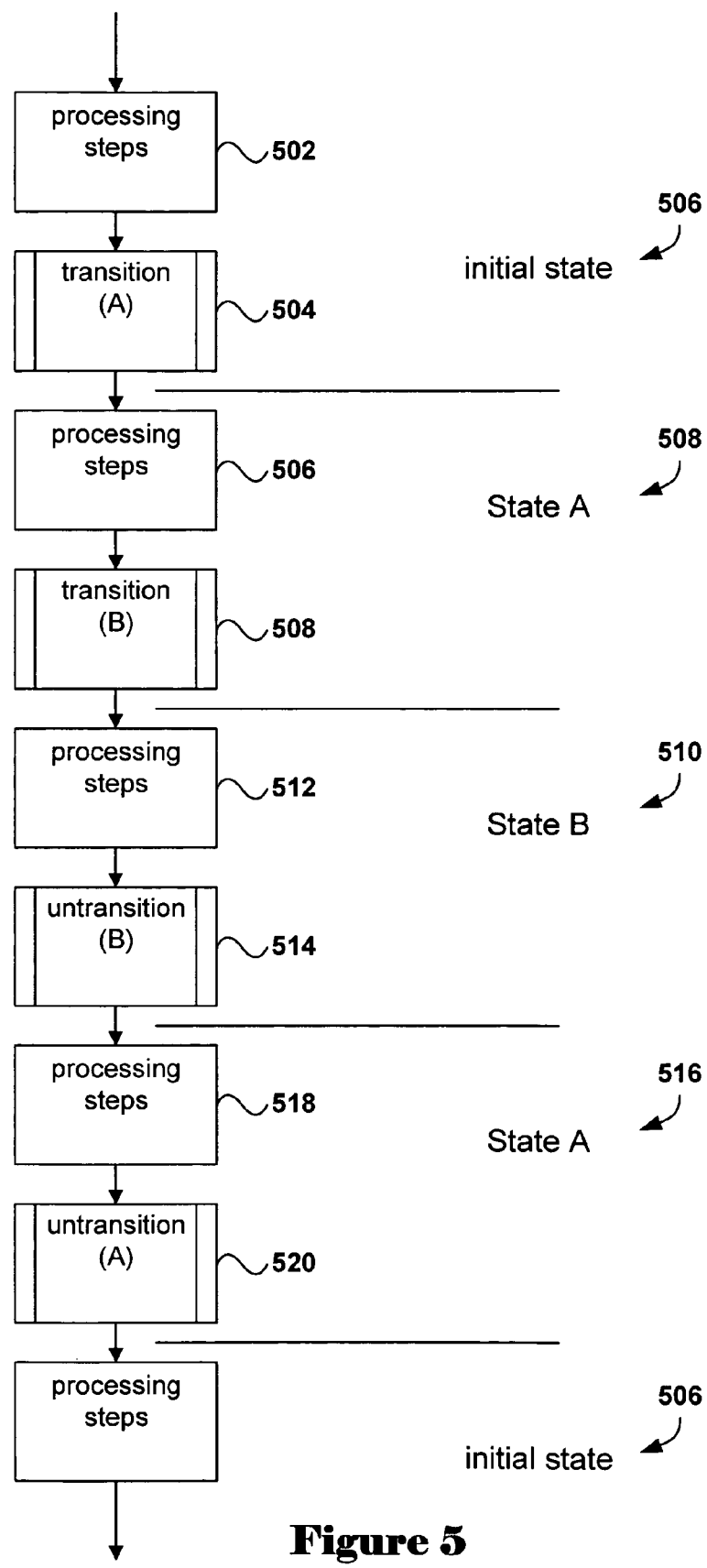
FIG. 5 illustrates the concept of state transitions.

One aspect of the approach embodied in various embodiments of the present invention concerns the establishment of well-defined state transitions within operating-system code. FIG. 5 illustrates the concept of state transitions. In FIG. 5, a portion of sequential execution of instructions within one or more operating system routine is shown in flow-control-diagram-like fashion. Various processing steps are performed in block 502, after which a call is made to a secure-kernel transition routine 504 that results in transition of the current state of the operating-system-executing from some initial state 506 to state A 508. Then, additional processing steps are undertaken by the operating system in block 506, followed by a second call to the secure-kernel routine "transition" 508 that results in a transition of the operating-system-execution state from state A 508 to state B 510. Subsequent processing steps in block 512 are followed by a call to the secure-kernel routine "untransition" 514 that results in transition of the operating-system-execution state from state B 510 back to state A 516. Subsequent processing steps are carried out in block 518, followed by a second call to the secure-kernel routine "untransition" 520 resulting in transition of the operating-system-execution state from A 516 back to the initial state 506. Thus, the secure-kernel routines "transition" and "untransition" are used to insert state transitions into operating-system code, resulting in the erection of state-transition barriers, in time, as the operating system code executes. If, for example, in the processing steps of block 512, the operating system calls a secure-kernel routine, the secure-kernel routine may check to ensure that the current operating-system-execution state is B before allowing the call to proceed. The state-transition barriers serve a similar function as the call-point stack method illustrated in FIG. 4, but represent a potentially far more efficient and more straightforwardly implemented approach.

Of course, were the secure-kernel routines "transition" and "untransition" allowed to be accessed by processing entities external to the operating system, such external processes could arrange to place the operating-system-execution state into any state prior to attempting to call a secure-kernel routine directly, thereby thwarting the transition-state mechanism. Secure-kernel routines are protected, by various different hardware and software-based security measures, so that a direct call is unlikely, but Trojan-horse code within an operating system could easily be devised to misuse the secure-kernel routines "transition" and "untransition" in order to defeat the transition-state barriers erected to control access to other secure-kernel routines. It is therefore desirable to provide, in addition to state transitions, a mechanism for preventing misuse of the secure-kernel "transition" and "untransition" routines.

Figure 6:
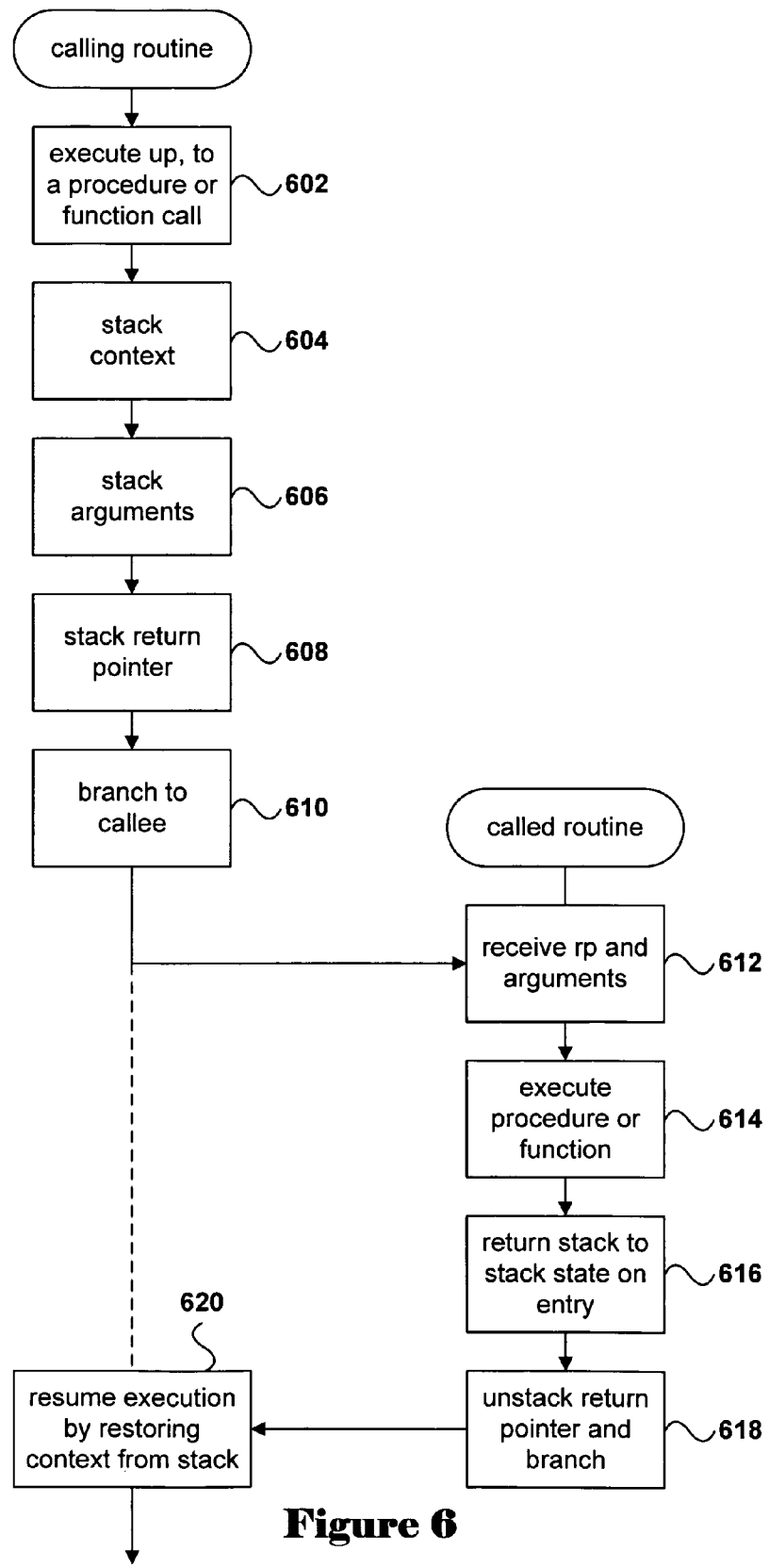
FIG. 6 illustrates a common approach used for passing arguments and return pointers from a calling routine to a called routine, as implemented by various assemblers and compliers, including those used for assembling and compiling operating-system routines.

FIG. 6 illustrates a common approach used for passing arguments and return pointers from a calling routine to a called routine, as implemented by various assemblers and compliers, including those used for assembling and compiling operating-system routines. The calling program executes instructions up to a procedure or function call 602. Prior to directing execution to the called procedure or function the calling routine stacks its register-based context onto a system stack 604, then stacks the values of arguments passed to the procedure or function 606, and finally stacks a routine pointer 608 used by the called routine to return execution to the instruction following the procedure or function call within the calling routine upon completion of the called routine. Once the arguments and routine pointer are stacked, the calling routine then executes 610 a branch instruction to the first instruction of the called routine. The called routine can retrieve the return pointer and arguments 612 stacked by the calling routine, and then execute the called procedure or function 614. Following execution of the called procedure or function, the called routine may return the system stack to the stack state upon entry 616, and then unstack the return pointer and branches back to the instruction of the calling routine following the call to the procedure or function 618. The calling routine then resumes execution by restoring its register-based context from the stack 620. The exact details, including the ordering of the stacked arguments and return pointer, may vary significantly between assemblers, compliers, and computer systems, but, in general, a called routine can easily determine the return pointer that the calling routine eventually employs to return control of execution to the calling routine.

Figure 8:
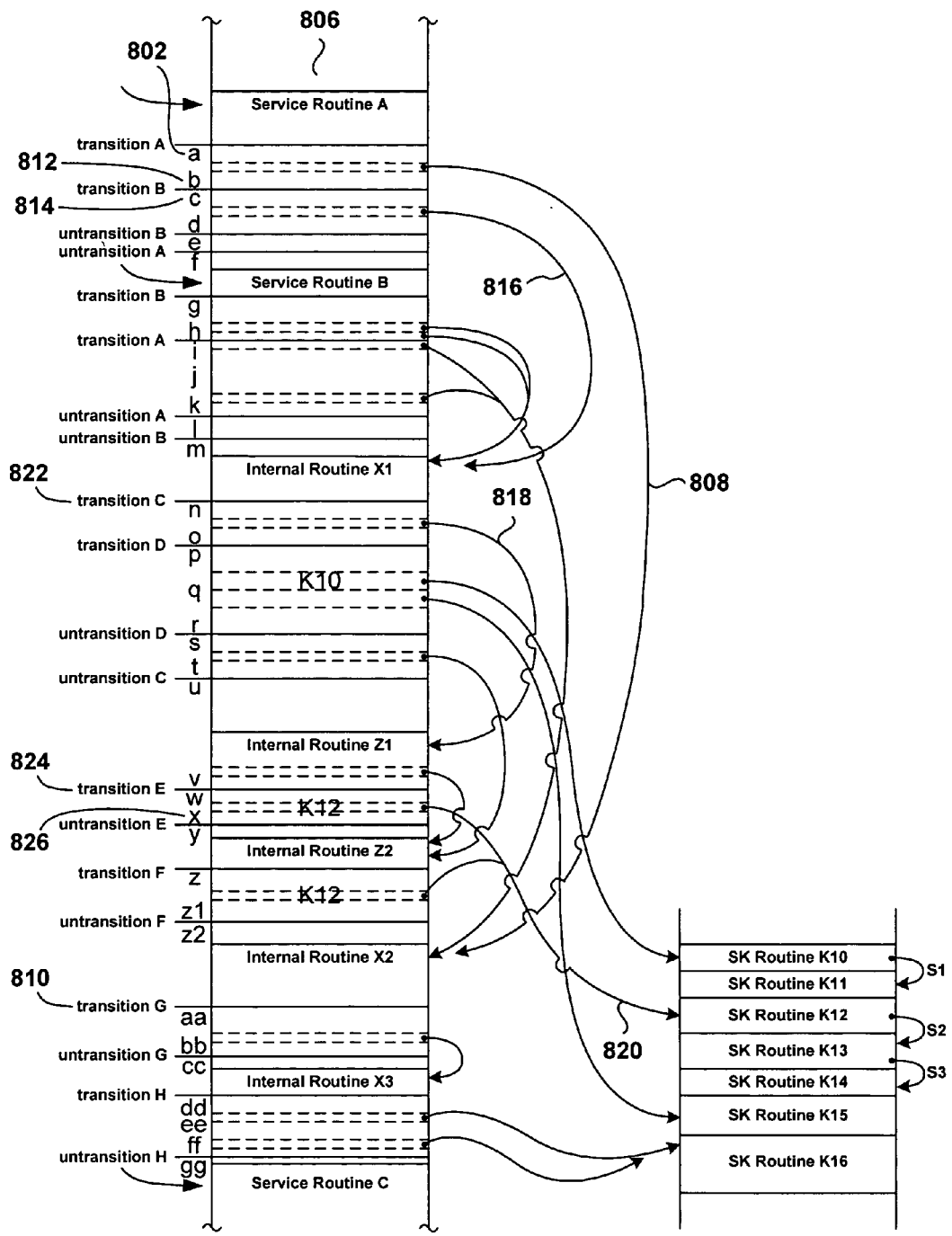
FIG. 8 shows calls to the secure-kernel routines "transition" and "untransition," employed in embodiments of the present invention, added to the example operating-system-routine layout of FIG. 2-3.

The return pointer is a tool that can be exploited by the secure-kernel routines "transition" and "untransition" in order to ensure that the state transition are made only at well-defined points within the operating system code. In one embodiment, two tables are allocated and maintained within secure memory of the secure kernel. FIG. 7 illustrates the allowed-transitions table and the allowed-calls table used in one embodiment of the present invention. The allowed-transitions table 702 includes entries, each representing an allowed state transition that can be carried out by calling either of the secure-kernel routines "transition" or "untransition." The allowed-calls table 704 contains entries, each of which represents a current operating-system-execution state, or cumulative state, that needs to exist in order for call to a specified secure-kernel routine to successfully execute. The contents of the exemplary allowed-transitions tables and allowed-calls table, shown in FIG. 7, may be understood with reference to FIG. 8. FIG. 8 shows calls to the secure-kernel routines "transition" and "untransition" added to the example operating-system-routine layout of FIG. 2-3. In FIG. 8, the lower-case labels, such as the lower-case "a" 802, indicate the address of an instruction directly following a routine call. Thus, the address of the instruction directly following the call to the secure-kernel routine "transition" 804 is symbolically represented as "a." Consider execution of service routine A 806. Initially, the operating-system-execution state is undefined, or is an initial state, represented in FIG. 7 by the state X. After the call to the secure-kernel routine "transition" 804, the operating-system-execution state is A, where state A is specified as an argument in the call to the secure-kernel routine "transition" 804. Therefore, entry 706 in the allowed-transitions table indicates that the state transition affected by the call 804 to the routine "transition" is allowed. Entry 706 specifies an allowed transition from state X 708 to state A 710, with the return pointer provided to the routine "transition" having the value "a" 712. While the current operating-system-execution state is A, service routine A calls internal routine X2 808, and a call to the routine "transition" in internal routine X2 810 affects an operating-system-execution state transition from state A to state G. Entry 714 in the allowed-transitions table indicates that a transition from state A 716 to state G 718 with an authorized-resumption-point value "aa" 720 is allowed. Note that a symmetrical entry 719 in the allowed-transitions table provides for a subsequent return from internal routine x2 back to service routine A. Service routine A subsequently calls the routine "transition" 812 to affect an operating-system-execution state transition from A to B. The allowed-transitions table entry corresponding to this state transition appears as entry 722, with the authorized-resumption-point value "c" 724 matching the address of the instruction 814 directly following the call to routine "transition" 812. While in operating-system-execution state B, service routine A calls internal routine X1 816, which in turns calls internal routine Z1 818, which then calls secure-kernel routine K12 820. In the chain of nested calls from service routine A 816 to secure-kernel routine K12 820, the operating-system-execution state changes from B to C 822 and from C to E 824. Entry 726 in the allowed-calls table 704 indicates that secure-kernel routine K12 may be called, with a return-pointer value "x" 728, corresponding to the address of the instruction 826 directly following the call to routine K12, when the current operating-system-execution state is E 730, the immediately previous operating-system-execution state is C 732, and the next preceding operating-system-execution state is B 734.

To summarize, the allowed-transitions table 702 contains entries, each entry containing an initial operating-system-execution state, an authorized resumption point, and a final operating-system-execution state. The allowed-transitions table is a complete description of all possible state transitions for the executing operating system code and the precise locations in the code to which execution is returned following each allowed state transition. The allowed-calls table includes an entry for each possible cumulative operating-system-execution state and location within the operating system code from which a call to each secure-kernel routine can be made. In the exemplary allowed-calls table, shown in FIG. 7, the cumulative operating-system-execution state includes the current and two most recent states. In alternative embodiments, only the current state may be used, and in any other embodiments, two, four, or more states may together comprise the cumulative operating-system-execution state. Note that, when more than two states together comprise the cumulative operating-system-executive state, provision is made for cumulative operating-system-execution states with fewer states due to proximity to entry points, such as, entry 736 in FIG. 7. The contents of the exemplary allowed-transitions table and allowed-calls table represent a complete description of the state transitions and nested call sequences shown in FIG. 8.

As discussed above, the allowed-transitions table and allowed-calls table, in one embodiment, are maintained within secure memory allocated to, and managed by the secure kernel. Secure-kernel memory is fully write-protected, so that the contents of these tables cannot be altered. Moreover, secure-kernel memory is not accessible to non-secure-kernel processes and threads.

Figure 9:
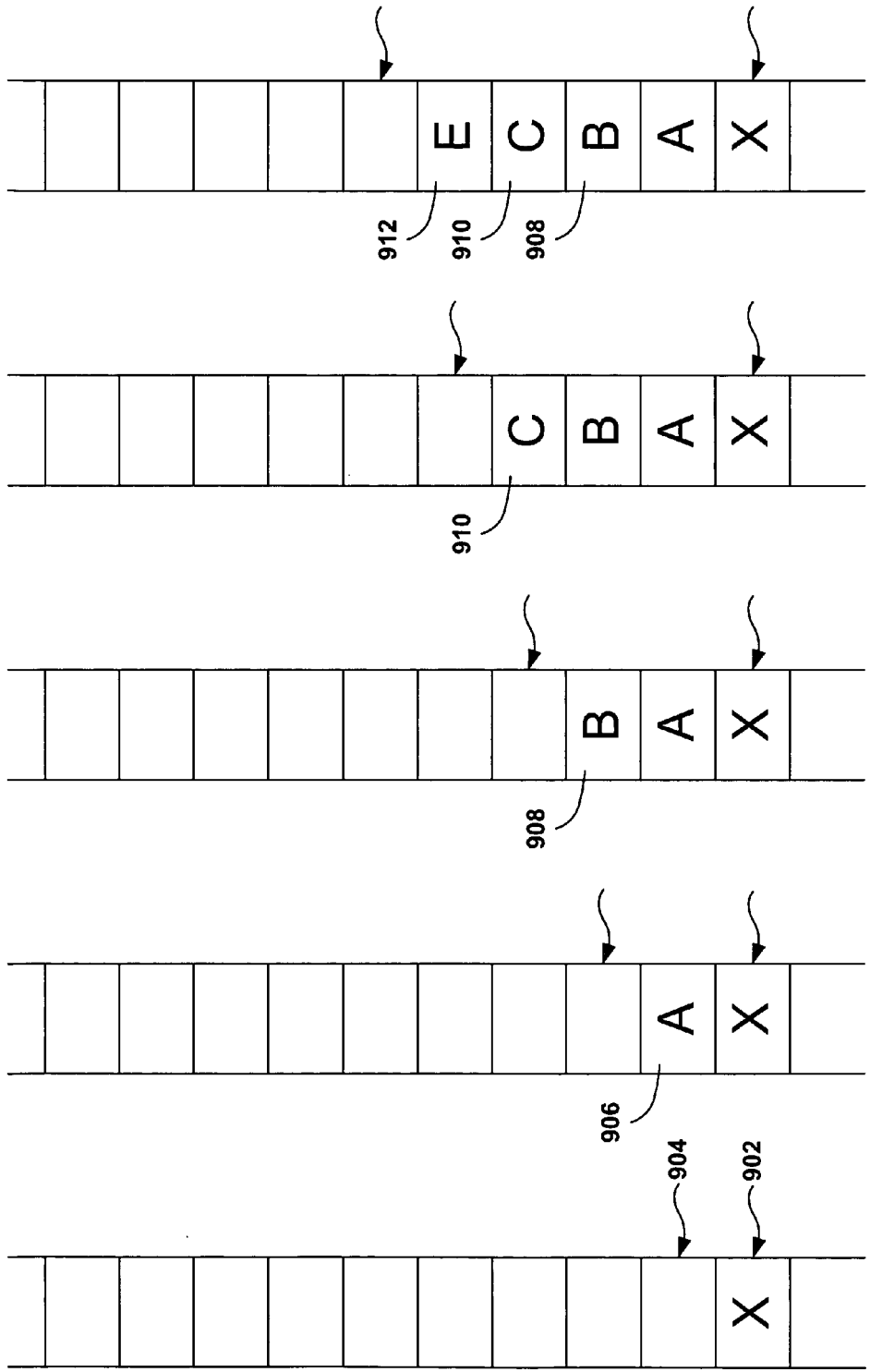
FIGS. 9A-E illustrate callpoint-log operation in the context of the exemplary operating-system code and secure-kernel code shown in FIG. 8, employed in an embodiment of the present invention.

One additional component of the described embodiment is a callpoint log maintained in secure-kernel memory for each process and thread, or, in other words, processing entity, that is securely executing within the computer system. In the described embodiment, the callpoint log is a stack of operating-system-execution states. Each call to the routine "transition" pushes an execution state onto the callpoint log, and each call to the routine "untransition" pops an execution state from the callpoint log. FIGS. 9A-E illustrate call point-log operation in the context of the exemplary operating-system code and secure-kernel code shown in FIG. 8. Consider invocation of service routine A 806 by processing entities external to the operating system. Initially, a callpoint-log management routine within the secure kernel, on allocation of a callpoint log for the external processing entity, places a default state X in to the callpoint log as the first entry of the callpoint log, as shown in FIG. 9A. The callpoint log, implemented as a stack, includes a first-entry pointer 902 and a pointer 904 referencing the next slot on the callpoint log into which a next execution state can be pushed. During initial execution of service routine A, the operating-system-execution state is therefore X. When the call to the routine "transition" 804 is executed, the operating-system-execution state transitions to A and the operating-system-execution state A 906 is pushed onto the callpoint log, as shown in FIG. 9B. When the invocation of the routine "transition" 812 is reached and executed, the operating-system-execution state B 908 is pushed onto the callpoint log, as shown in FIG. 9A. Following transitions to operating-system-execution state B, service routine A calls 816 internal routine X1, within which a call to the routine "transition" 822 causes the operating-system-execution state to transition from B to C, with a corresponding push of operating-system-execution state C 910 onto the call point, as shown in FIG. 9D. Internal routine X1 then calls 818 internal routine Z1, which, in turn, calls the routine "transition" 824, resulting in transition of the operating-system-execution state from C to E and pushing of the operating-system-execution state E 912 onto the callpoint log, as shown in FIG. 9E. While at operating-system-execution state E, internal routine Z1 then calls the secure-kernel routine K12 820. Again as mentioned above, secure-kernel routine K12 can search the allowed-calls table 704 in FIG. 7 to find entry 726, with the authorized resumption point 728 equal to the address 826 following the call to secure-kernel routine K12 and with the cumulative operating-system-execution state "ECB" 730, 732, and 734 equal to the three most recent states, including the current state, on the callpoint log 912, 910, and 908.

Figure 10:
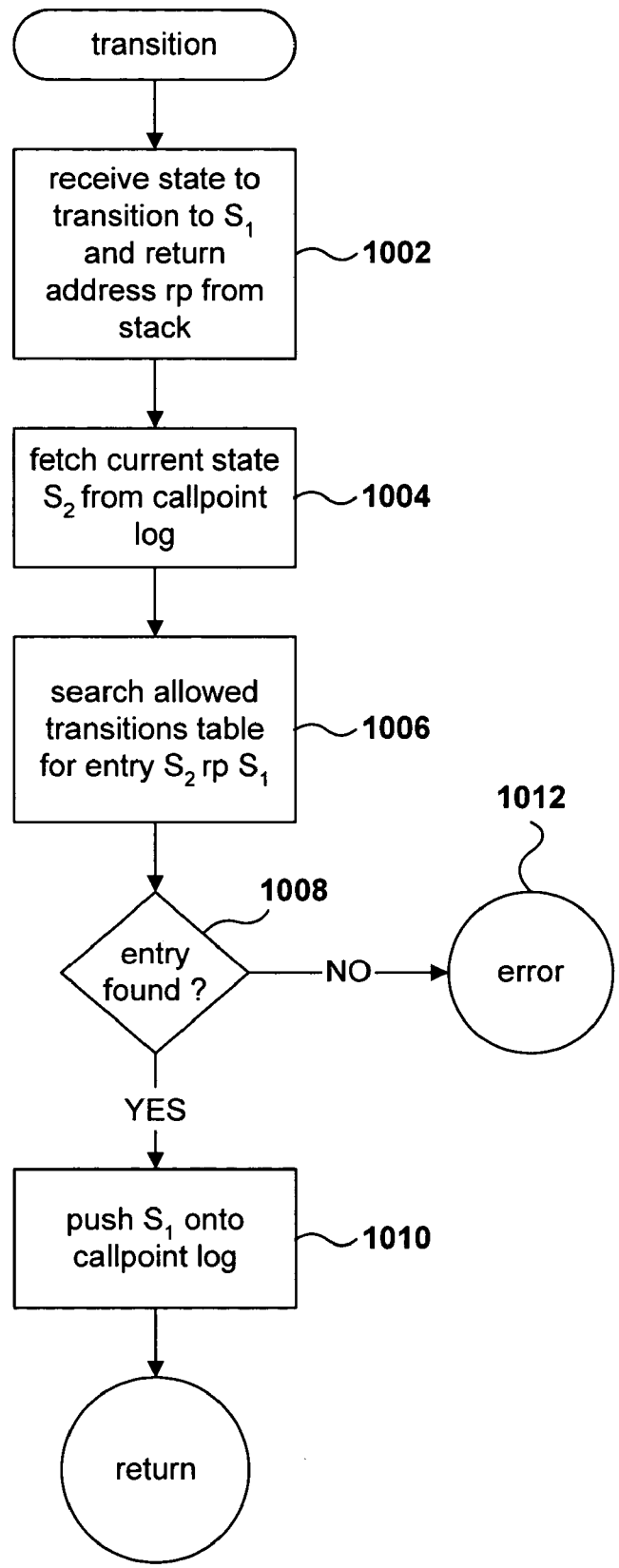
FIG. 10 is a flow-control diagram of the routine "transition," employed in an embodiment of the present invention.
Figure 11:
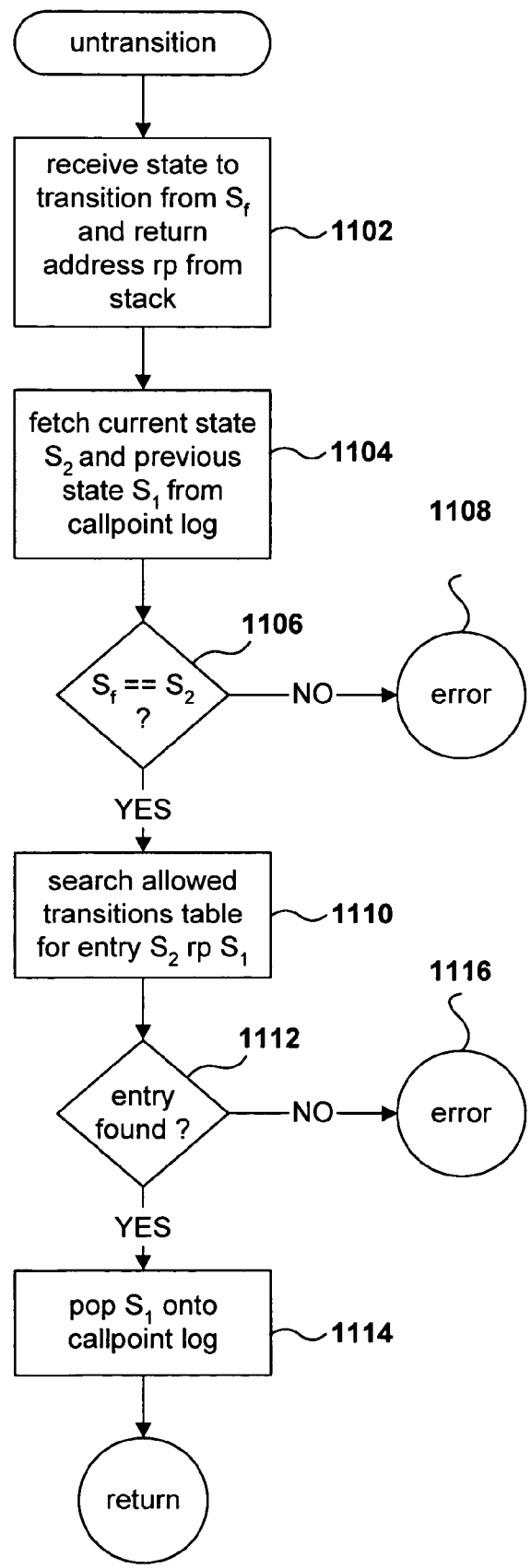
FIG. 11 is a flow-control-diagram of the routine "untransition," employed in an embodiment of the present invention.

Next, in FIGS. 10-12, a flow-control-diagram description of the secure-kernel routines "transition" and "untransition" are provided, as well as a routine-like description of the checking code that may be used in each secure-kernel routine to authorize access, or which may be, alternatively, embodied in a separate secure-kernel routine called at or near the beginning of each secure-kernel routine in order to authorize access. FIG. 10 is a flow-control diagram of the routine "transition." In step 1002, the routine "transition" receives the execution state argument indicating to which operating-system execution state, $S_1$, a transition is sought by the caller of the routine "transition," and obtains the return pointer, or return address, rp, from the system stack. In step 1004, the routine "transition" fetches the current operating-system-execution state, $S_2$, from the callpoint log. In step 1006, the routine "transition" searches the allowed-transitions table for an entry containing the values: $S_2$ rp $S_1$. Such an entry would represent the transition sought by the caller of the routine "transition." If the entry is found, as detected in step 1008, then the routine "transition" pushes the new operating-system-execution state $S_1$ onto the callpoint log in step 1010, and returns. Otherwise, an error condition obtains in step 1012. The error condition may be handled in different ways in various different embodiments and in different operating systems. For example, the error condition may result in logging of the error and halting of processing on the computer system. Less severe error handling actions may be taken in alternative embodiments.

FIG. 11 is a flow-control-diagram of the routine "untransition". In step 1102, the routine "untransition" receives, as an argument, an identification of the operating-system-execution state, $S_f$, from which to transition and the return pointer provided by the calling routine, rp, from the stack. In step 1104, the routine "untransition" fetches the current operating-system-execution state, $S_2$, from the callpoint log, as well as the previous operating-system-execution state, $S_1$. If the specified execution state $S_f$ is not equal to the current execution state $S_2$, as detected in step 1106, then an error condition obtains, in step 1108. Otherwise, the routine "untransition," in step 1110, searches the allowed-transitions table for the entry: $S_2$ rp $S_1$. If the entry is found, as detected in step 1112, then, in step 1114, the routine "untransition" pops the current execution state $S_2$ from the callpoint log and returns. Otherwise, an error obtains in step 1116. As with the routine "transition," various different error-handling strategies may be employed, including logging the error and shutting down the computer system, or less severe types of error handling.

Figure 12A:
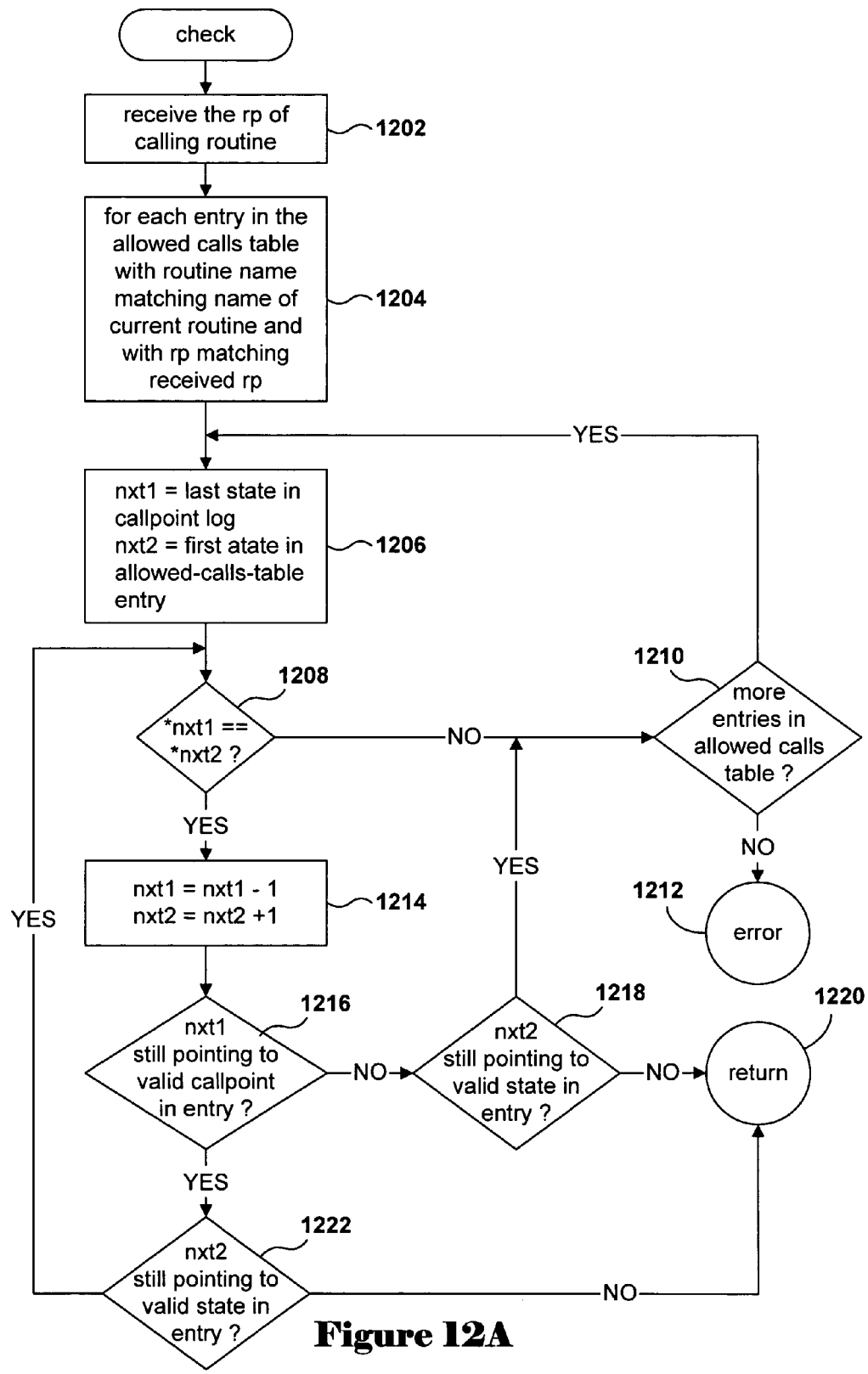
FIG. 12A is a flow-control diagram of the routine "check," employed in an embodiment of the present invention.
Figure 12B:
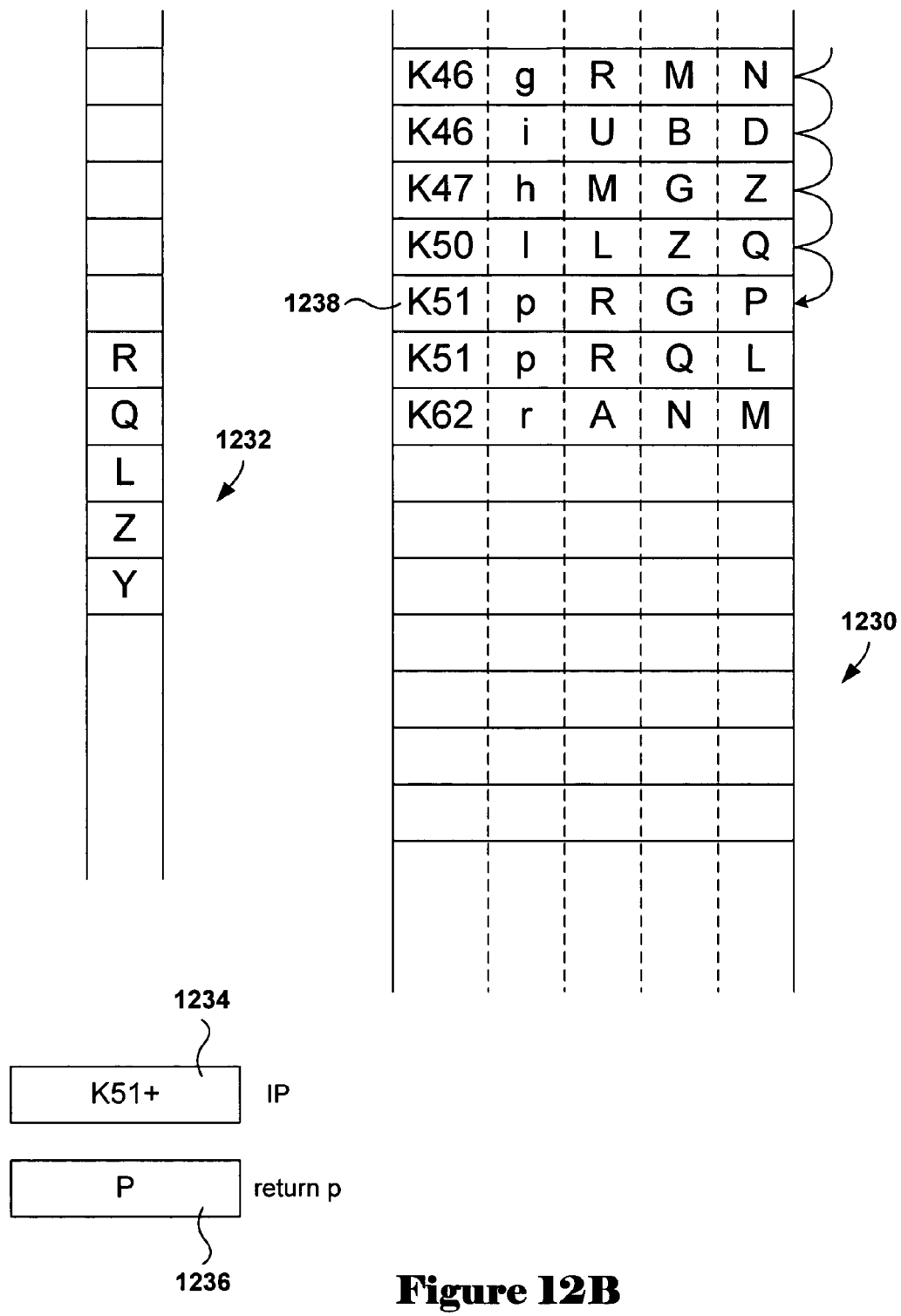
FIGS. 12B-F illustrate operation of the routine "check," employed in an embodiment of the present invention.

FIG. 12A is a flow-control diagram of the routine "check." This routine may be called at or near the beginning of each secure-kernel routine in order to authorize a call to that routine using the information contained in the allowed-calls table and in the callpoint log for the calling process. Alternatively, the logic shown for the routine "check" may be embodied directly in each secure-kernel routine. In step 1202, the routine "check" receives the return pointer, rp, provided by the calling routine on the stack. Note that the calling routine is the routine that has called the secure-kernel routine and is not, in the case that the logic of routine "check" is embodied in a separate routine called by the secure kernel routine, the secure kernel routine. Then, in a for-loop beginning with step 1204, the routine "check" searches for an entry in the allowed-calls table that authorizes a call to a secure-kernel routine. For each entry in the allowed-calls table with the secure-kernel-identifying field equal to the secure-kernel routine, authorization for which is being checked, and for which the authorized-resumption-point field includes an authorized-resumption-point value equal to the return pointer, rp, obtained from the stack in step 1202, the routine "check" compares, in subsequent steps, the cumulative operating-system-execution state contained in the remaining fields of the allowed-calls-table entry with the contents of the callpoint log. In step 1206, the routine "check" sets the pointer "nxt1" to the last, or current execution state in the callpoint log and sets the counter "nxt2" to the first state in the currently selected allowed-calls table entry. If the states pointed to be pointers "nxt1" and "nxt2" are not equal, as detected in step 1208, then the routine "check" determines, in step 1210, whether or not there are more entries in the allowed-calls table to consider. If so, then control flows back to step 1206, for consideration of a subsequent allowed-calls-table entry. If not, then an error obtains, in step 1212. The error indicates that no authorizing entry in the allowed-calls table can be found for the current call to the secure-kernel routine for which the authorization check represented by the routine "check" is being currently conducted. If, on the other hand, the states pointed to by pointers "nxt1" and "nxt2" are equal, as detected in step 1208, then the pointer "nxt1" is decremented and the pointer "nxt2" is incremented, in order to move to the next execution state in the cumulative operating-system-execution state residing in the callpoint log and potentially residing in the currently considered allowed-calls-table entry, in step 1214. In step 1216, the routine "check" checks to see if the pointer "nxt1" is still pointed to a valid callpoint log entry. If not, then in step 1218, the routine "check" determines whether or not the pointer "nxt2" is still pointed to a valid state in the currently considered allowed-calls table entry. If not, then all of the states included in the allowed-calls-table entry have been matched with corresponding entries in the callpoint log, indicating that an authorizing allowed-calls-table entry has been found, and the routine "check" returns, in step 1220. Otherwise, an insufficient number of states are present on the callpoint log to match the states in the currently considered entry, and control is directed to step 1210. If the pointer "nxt1" is not still pointed to a valid callpoint log entry, as determined in step 1216, then in step 1222, the routine "check" determines whether or not the pointer "nxt2" is still pointed to a valid state in the allowed-calls table entry. If so, then control flows back in step 1208 for matching of the next states in both the callpoint log and the allowed-calls-table entry. If not, then all states in the allowed-calls-table entry have been matched with corresponding states in the callpoint log, and the routine "check" returns.

Figure 12C:
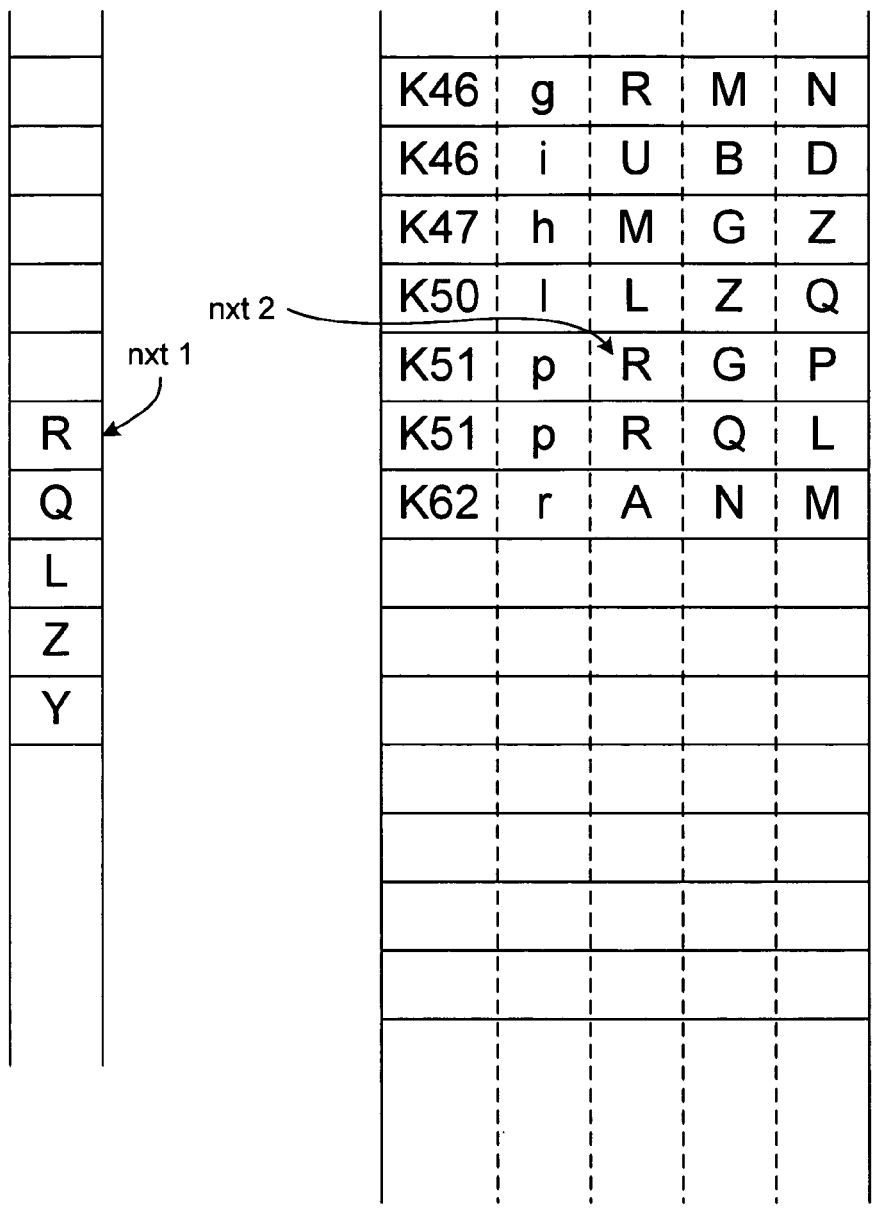
Figure 12D:
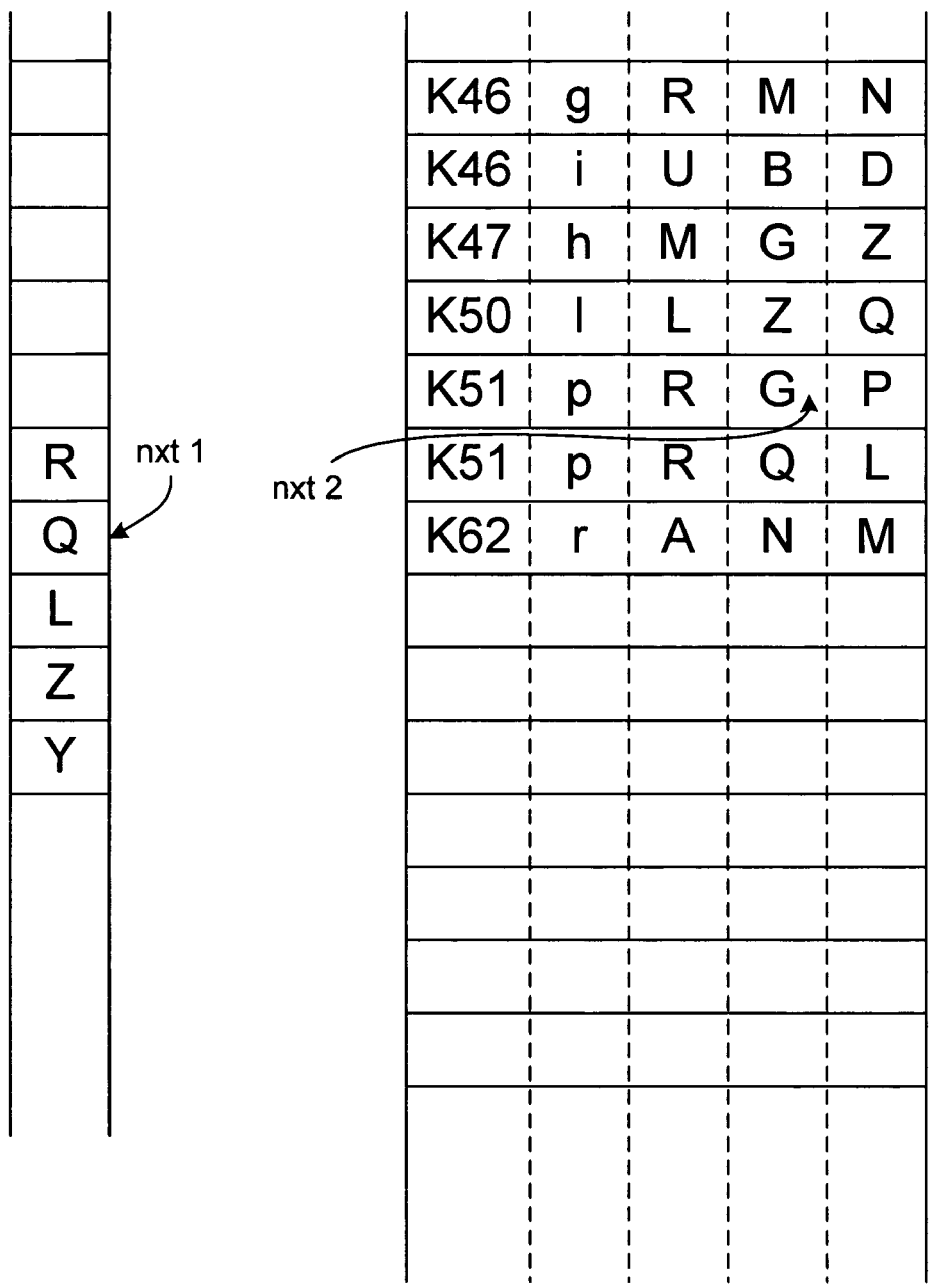
Figure 12E:
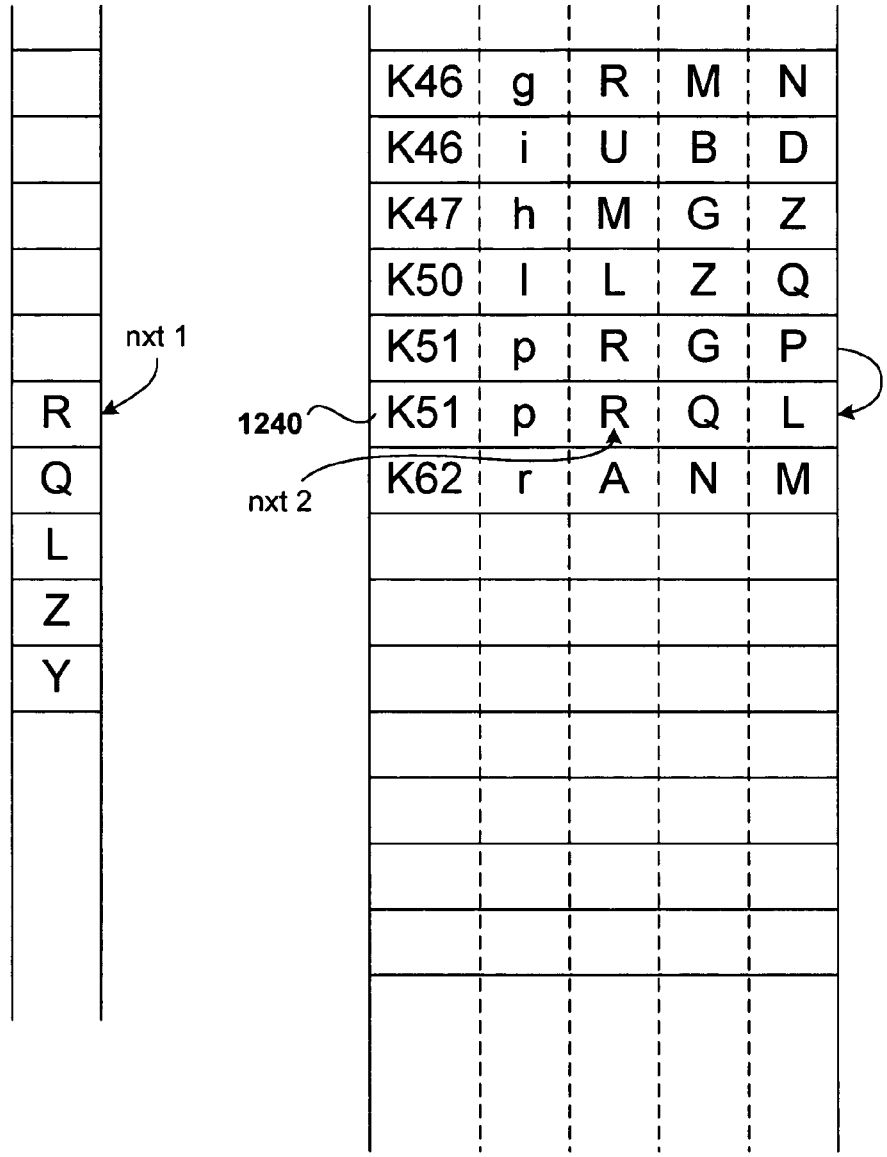
Figure 12F:
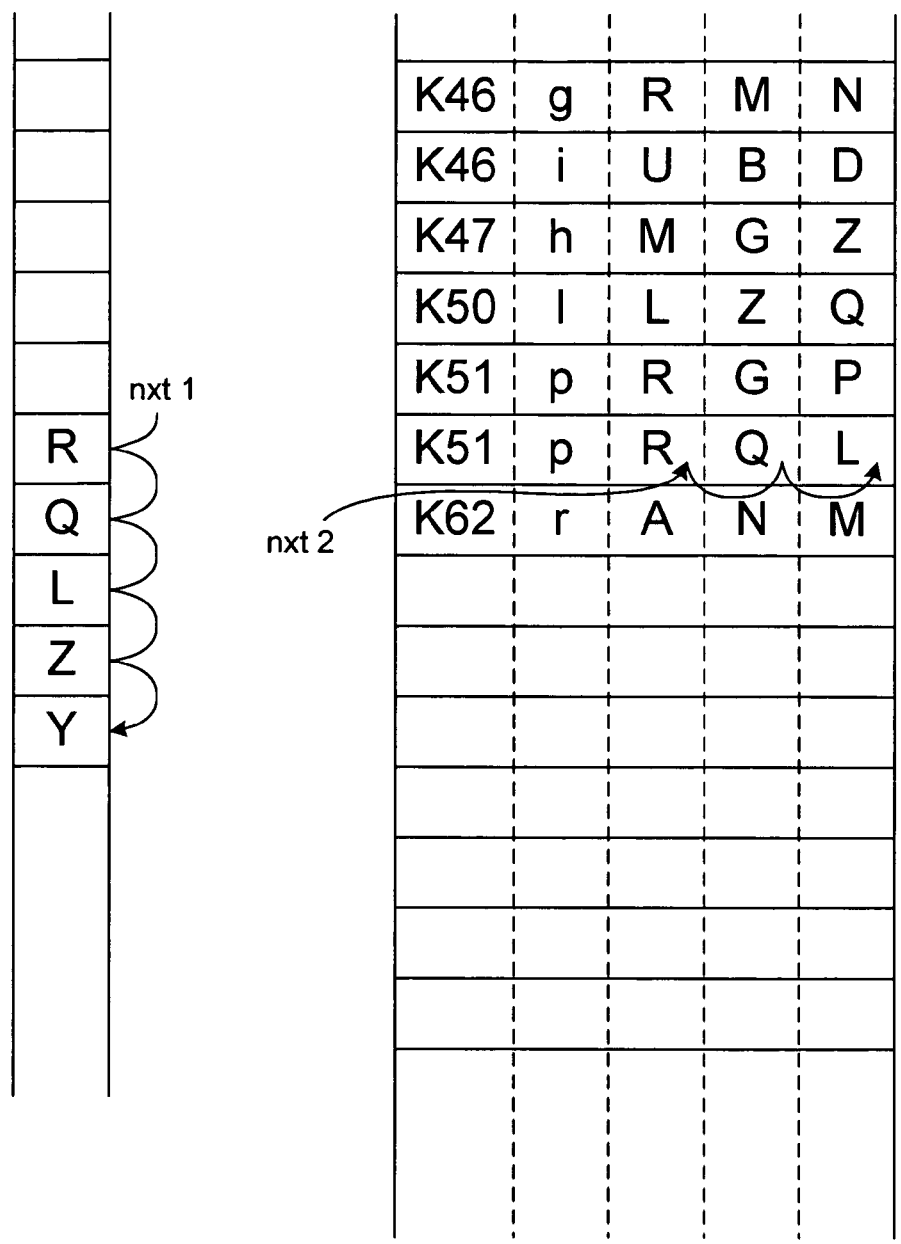

FIGS. 12B-F illustrate operation of the routine "check." In FIGS. 12B-F, an example allowed-calls table 1230 and an example callpoint log 1232 are shown for a process that is currently executing kernel routine "K51" 1234 with a return pointer containing the address "p" 1236. When the routine "check" is called by kernel routine "K51," the allowed-calls-table entries are traversed, from the first entry to entry 1238 by the for-loop with first step 1204 in FIG. 12A, until an allowed-calls-table is found with a routine name matching that of the currently running routine and a return pointer matching the return pointer for the currently running process. Then, the pointers "nxt1" and "nxt2" are initialized in step 1206, as shown in FIG. 12C. Then, as shown in FIG. 12D, while the contents of pointers "nxt1" and "nxt2" are equal, as detected in step 1208, the pointer "nxt1" is decremented, and the pointer "nxt2" is incremented. In this case, since nxt1 and nxt2 continue to point to a valid callpoint log entry and a valid state in an allowed-calls-table entry, respectively, control flows through steps 1216 and 1222 back to step 1208, where the test for equality fails, and the for-loop with first step 1206 moves to the next allowed-calls-table entry 1240, as shown in FIG. 12E. Then, the callpoint log and the states within the allowed-calls-table entry 1240 are traversed, as shown in FIG. 12F, with the final increment of nxt2 exhausting the states in allowed-calls-table entry 1240. In this case, although the test in step 1216 succeeds, the test in step 1222 fails, and the routine "check" returns without an error.

Figure 13:
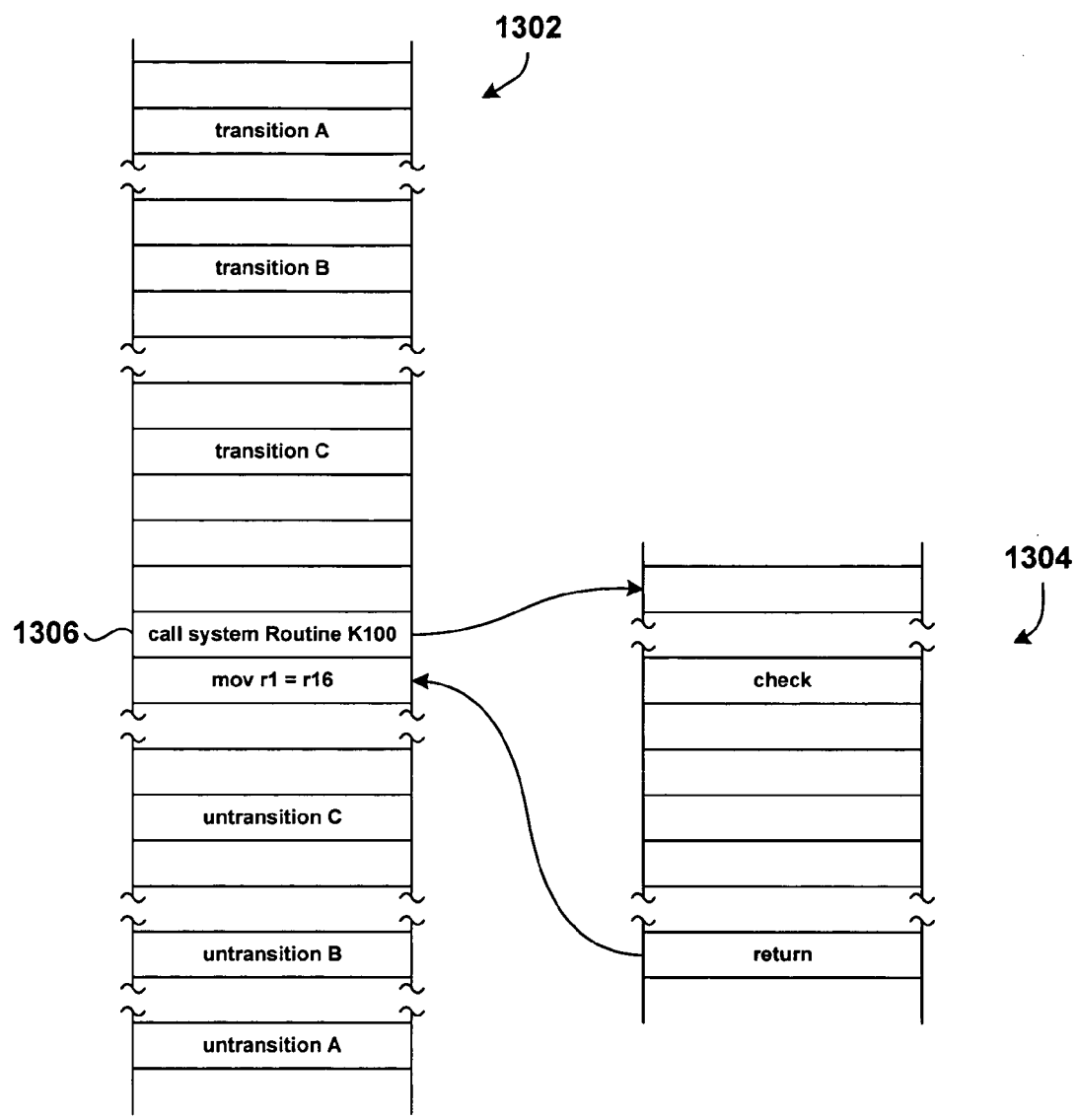
FIG. 13 shows an exemplary secure-kernel-routine call within an execution path of operating-system code, in the style of FIGS. 2-3, and 8.

The present invention, an embodiment of which is described above in the context of a secure operating-system kernel, can efficiently and straightforwardly protect against a large proportion of the many types of security-breach strategies. FIG. 13 shows an exemplary secure-kernel-routine call within an execution path of operating-system code, in the style of FIGS. 2-3, and 8. The operating-system-execution path is represented by a series of instructions and routine calls 1302, and the called secure-kernel routine is represented by a parallel set of instructions 1304. During the operating-system-execution path, calls to the routine "transition" result in cumulative operating-system-execution state of "ABC" at the point of the call 1306 to the secure-kernel routine "K100".

Figure 14:
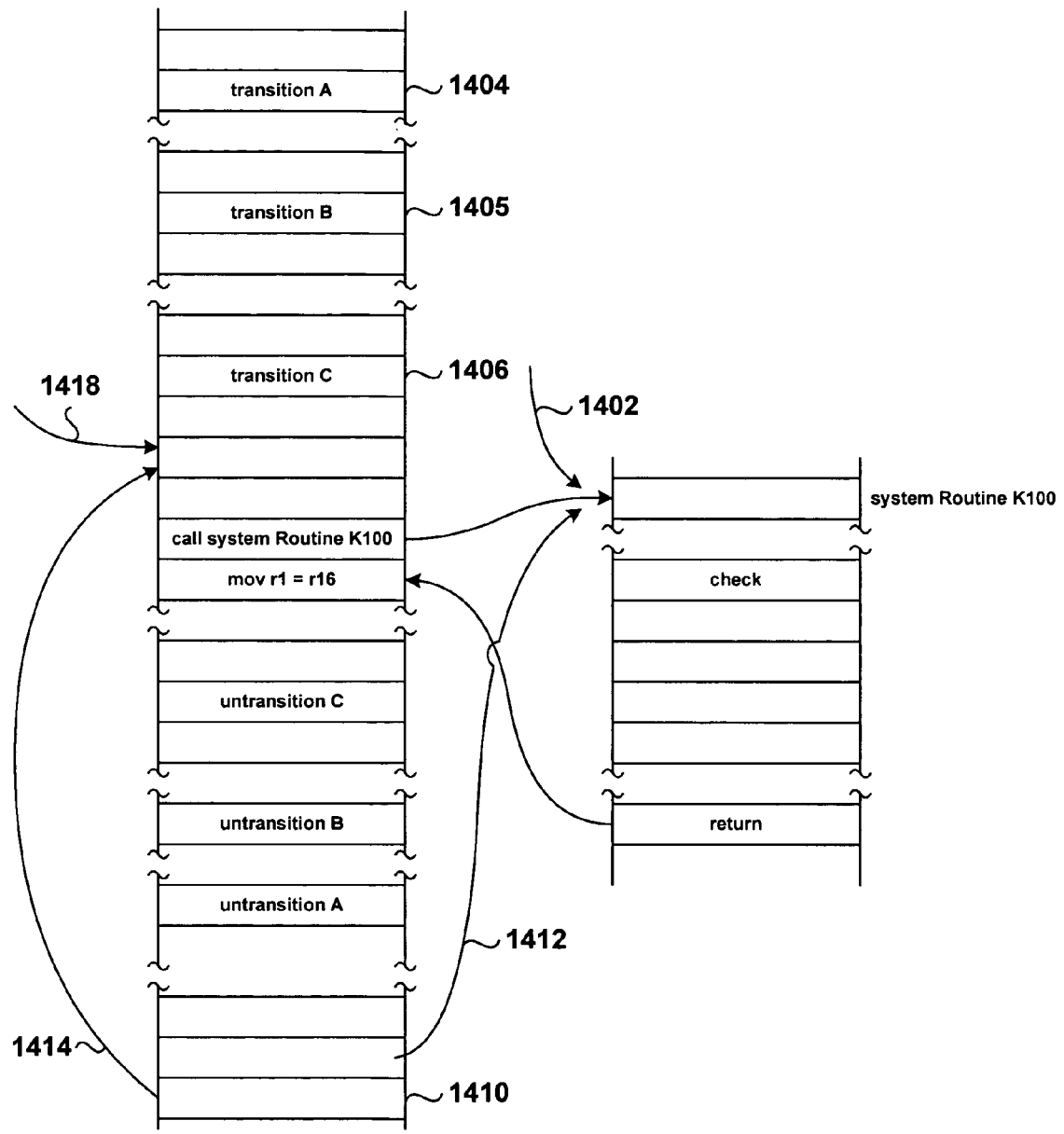
FIG. 14 illustrates, using the example provided in FIG. 13, various possible security attacks that attempt to call the secure-kernel routine "K100" in an unauthorized fashion.

FIG. 14 illustrates, using the example provided in FIG. 13, various possible security attacks that attempt to call the secure-kernel routine "K100" in an unauthorized fashion. For example, a malicious routine may attempt to directly call 1402 the secure-kernel routine "K100." However, the check made according to the flow-control-diagram shown in FIG. 12A fails, since a direct call to the secure-kernel routine "K100" would not result in the required cumulative operating-system-execution state "ABC," since the calls to the routine "transition" 1404-1406 would not have been made. Introduction of a Trojan-horse routine 1410 within the operating system that includes either calls directly to the secure kernel routine 1412 or to a point 1414 in the execution path from which the secure-kernel routine "K100" is then called would also fail, for the same reason. An attempt to begin execution at a point just prior 1418 to call to secure-kernel routine "K100" would also fail for lack of the prior cumulative operating-system-execution state.

Figure 15:
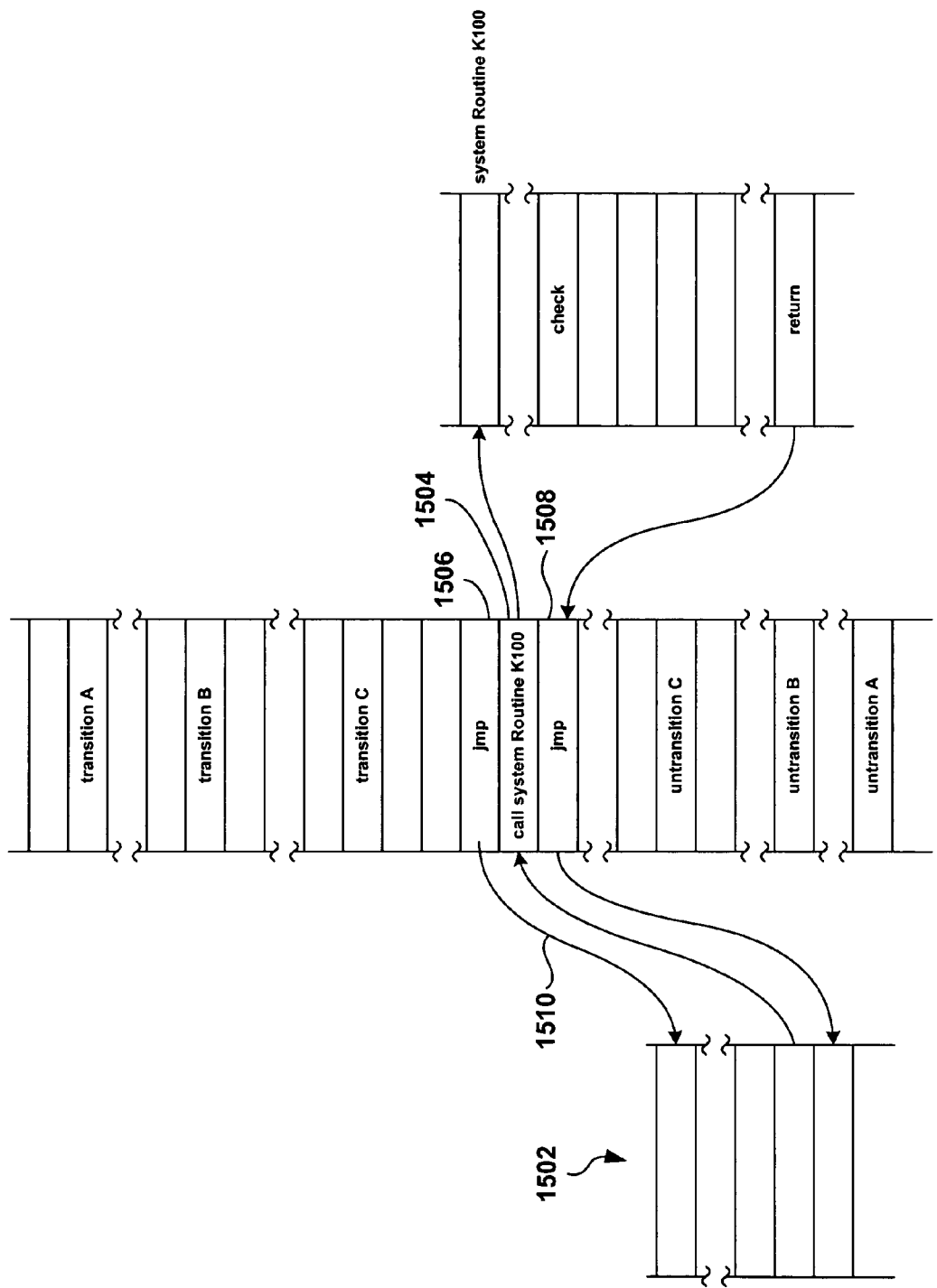
FIG. 15 illustrates one type of attack that might be used to defeat the caller authorization method of the present invention.

In order to defeat the caller authorization method of the present invention, a relatively sophisticated, inside attack would be necessary. FIG. 15 illustrates one type of attack that might be used to defeat the caller authorization method of the present invention. As shown in FIG. 15, a vehicle for the attack 1502 would need to be either an external routine that can defeat other security measures and directly call instructions within the operating system code, or a Trojan-horse routine introduced into the operating system code. The attacker would need to have the knowledge to identify a point in the operating-system code at which a desired secure-kernel routine is called, such as the point 1504. Then, the attacker would need to alter the operating-system code, overriding instructions preceding and following the secure-kernel-routine call with jump instructions 1508. Then, the attacker would need to invoke the service routine of the operating system that results in execution of the operating-system code including the inserted jump instructions and the call to the desired secure-kernel routine, so that the corrupted service routine transfers control 1510 to the Trojan-horse or other vehicle 1502. The Trojan-horse routine could then alter the execution state to its purposes and then return control to the secure-kernel-routine call 1504 following which the inserted jump instruction 1508 would return control back to the Trojan-horse.

This security-breaching attack is quite improbable. First, the attacker must intimately know the operating system code, and be able to overwrite the operating system and to defeat the many other security measures embodied in the operating system to prevent unauthorized access to operating-system routines. Moreover, the attacker would need to identify similar computer-kernel-call positions for each secure-kernel routine the attacker wishes to use. The vast majority of security breaches do not arise from insiders intimately familiar with the operating-system code, but instead arise from rather crude overriding of operating-system routines or introduction of viruses and Trojan-horses through communications devices and mass-storage devices. These crude methods generally rely on obtaining secret information to unlock portions of the operating system or rely on pure destructiveness.

The caller authorization method of the present invention can be straightforwardly implemented, involves comparatively little computational overhead, and therefore does not decrease the efficiency of the computer system, and involves relatively compact in-memory data structures. Moreover, the computational overhead does not grow with the depth of the nested calling. It provides a very large degree of security with respect to its modest computational overhead, and can be extremely flexibly applied. For example, the transition points can be more or less arbitrarily defined within the operating system code, and can be non-uniformly distributed in order to provide high security in those areas requiring high security, and relatively low security in areas deemed less prone to attack.

In an alternative embodiment, rather than employing a stack for the callpoint log, illustrated in FIGS. 9A-E may be implemented as a mathematical combination of separate state signatures. In another embodiment, each state is represented as a single-bit within a bitmap, and turned on an off as a process transitions to the state and transitions from the state. Extensions to the bit-map implementation may be made to handle states that may be transitioned to repeatedly before an untransition from the state. Various portions of the above-described caller authorization system may be implemented in hardware, including the callpoint log, allowed-transitions table, allowed-calls table, and the above-described routines that authorize kernel calls. In the above described embodiment, system operation is discontinued once an authorization error is discovered. In various embodiments, the actions taken upon authorization failure may include an immediate halt, invocation of a special operating system state that allows an administrator to interact with the operating system to diagnose the authorization failure, failure of the process for which the authorization failure is detected, and logging of the authorization error, or posting of warnings and an automated attempt to secure system resources from unauthorized access while attempting to identify a malicious user attempting to gain access to system resources.

Although the present invention has been described in terms of a particular embodiment, it is not intended that the invention be limited to this embodiment. Modifications within the spirit of the invention will be apparent to those skilled in the art. For example, an almost limitless number of different implementations of the allowed-transitions table, the allowed-calls table, the callpoint log, and the routines "transition" and "untransition" are possible. Execution states can be represented by any of a variety of different data types, including integers of various sizes. As discussed above, the number of individual states that together compose a cumulative operating-system-execution state may vary from one to many, depending on the level of security desired. For example, in the described embodiment, three execution states together compose a cumulative execution state. The described embodiment involves protected access to secure-kernel routines by directing transition-state barriers within the operating-system code, but the method can be applied to protect any type of more secure software layer from a less-secure software layer. Moreover, the technique may be applied both to guard against security breaches in commercial systems, as well as to assist in catching errors in prototype systems. In other words, the technique can serve both as a security mechanism as well as system debugging and evaluating tool. When used as a debugging tool, the allowed-transitions table, the allowed-calls table, the callpoint log may not need to be secured or protected to the extent needed when used for a security-related embodiment.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method of providing secure access of an execution-state-transition routine in a first software layer from a second software layer, the method comprising:
    inserting a call, into the second software layer to the execution-state-transition routine in a computer system, wherein the call specifies a transition to a specified execution state and indicates an execution resumption point within the second software layer by passing to the execution-state-transition routine a return pointer;
    during execution of the second and first software layers in the computer system, maintaining a callpoint log to track a current execution state; and
    the called execution-state-transition routine determining based on the specified execution state, the return pointer, and the current execution state retrieved from the callpoint log whether the transition to the specified execution state is allowed, wherein determining whether the transition to the specified execution state is allowed comprises accessing an allowed-transitions table to determine if any entry exists in the allowed-transitions table that corresponds to a combination of the specified execution state, the return pointer, and the current execution state retrieved from the callpoint log.

2. The method of claim 1, wherein the return pointer is an address of an instruction in the second software layer at which execution resumes following completion of the execution-state-transition routine.

3. The method of claim 1, wherein the return pointer is passed to the execution-state-transition routine on a stack.

4. The method of claim 1 wherein the callpoint log is a first-in, last-out memory stack maintained by the first software layer onto which execution states are pushed and from which execution states are popped by execution-state-transition routines.

5. The method of claim 1 wherein the callpoint log is a mathematical combination of separate state signatures.

6. The method of claim 1 wherein the callpoint log is a bit map, each state represented as a single-bit within the bitmap, and turned on and off as a process transitions to the state and transitions from the state.

7. The method of claim 1 wherein the callpoint log is implemented in memory in combination with one or more software routines.

8. The method of claim 1 wherein the callpoint log is implemented in hardware as a combination of logic circuits, registers, and memory.

9. Computer instructions implementing first and second software layers monitored by the method of claim 1 encoded in a computer readable storage medium.

10. The method of claim 1 wherein the first software layer is a secure operating-system kernel and the second software layer is an operating system.

11. The method of claim 1 wherein the first software layer is an operating system and the second software layer is an application program.

12. The method of claim 1 wherein the first software layer is a first application program and the second software layer is a second application program.

13. The method of claim 1 used to prevent unauthorized access to system resources.

14. The method of claim 1 used to prevent unauthorized access to debug the second software layer.

15. A method of providing secure access of an execution-state-transition routine in a first software layer from a second software layer, the method comprising:
    inserting a call, into the second software layer to the execution-state-transition routine in a computer system, wherein the call specifies a transition to a specified execution state and indicates an execution resumption point within the second software layer by passing to the execution-state-transition routine a return pointer;
    during execution of the second and first software layers in the computer system, maintaining a callpoint log to track a current execution state; and
    the called execution-state-transition routine determining based on the specified execution state, the return pointer, and the current execution state retrieved from the callpoint log whether the transition to the specified execution state is allowed, maintaining, by the first software layer, an allowed-transitions table including entries that specify allowed execution-state transitions and execution resumption points for the calls to the execution-state-transition routine, wherein determining whether the transition to the specified execution state is allowed comprises accessing the allowed-transitions table to determine if an entry exists in the allowed-transitions table that corresponds to a combination of the specified execution state, the return pointer, and the current execution state retrieved from the callpoint log.

16. The method of claim 15, further comprising storing the allowed-transitions table in a secure memory.

17. The method of claim 15 wherein the allowed-transitions table is implemented in hardware as a combination of logic circuits, registers, and memory.

18. A method for monitoring access of routines in a first software layer through a second software layer, the method comprising:

inserting calls, into the second software layer to one or more execution-state-transition routines in a computer system, that each specifies a transition and that each indicates the execution resumption point within the second software layer to the execution-state-transition routine by passing to the execution-state-transition routine a return pointer;

during execution of the second and first software layers in the computer system, maintaining a callpoint log to track a cumulative execution state;

in a first software layer routine, determining, for each attempt to access the first software layer routine, whether the cumulative execution state is compatible with execution of the first software layer routine; and maintaining, by the first software layer, an allowed-calls table including entries that specify:
the first software layer routine to be called;
an authorized execution resumption point for the call to the first software layer routine; and
a cumulative execution state needed for the call to the first software layer routine to proceed.

19. The method of claim 18 wherein the allowed-calls table is implemented in memory in combination with one or more software routines.

20. The method of claim 18 wherein the allowed-calls table is implemented in hardware as a combination of logic circuits, registers, and memory.

21. The method of claim 18 wherein the cumulative execution state is a fixed number of execution states, including a current execution state and, if the fixed number is greater than 1, a set of one or more most recent execution states.

22. A method for monitoring access of routines in a first software layer through a second software layer, the method comprising:

inserting calls, into the second software layer to one or more execution-state-transition routines in a computer system, that each specifies a transition and that each indicates the execution resumption point within the second software layer to the execution-state-transition routine by passing to the execution-state-transition routine a return pointer;

during execution of the second and first software layers in the computer system, maintaining a callpoint log to track a cumulative execution state; and in a first software layer routine, determining, for each attempt to access the first software layer routine, whether the cumulative execution state is compatible with execution of the first software layer routine;

wherein determining whether the cumulative execution state is compatible with execution of the software layer routine comprises:

locating an entry in an allowed-calls table with fields identifying the first software layer routine, an authorized execution resumption point within the second software layer from the first software layer routine, and a cumulative execution state identical to the most recent cumulative execution state on the callpoint log for a currently executing process.

23. A computer system comprising:

a computer-readable storage medium storing a first software layer and a second software layer, the first software layer having an execution-state-transition routine callable by the second software layer, both the first and second software layers executable within the computer system as components of the computer system, the first and second software layers comprising:

a set of computer instructions that implement first-software-layer logic;

a set of computer instructions that implement second-software-layer logic;

wherein a call by the second software layer to the execution-state-transition routine specifies a transition to a specified execution state and indicates an execution resumption point within the second software layer by passing to the execution-state-transition routine a return pointer;

wherein the computer-readable storage medium further stores a callpoint log maintained by the first software layer to track a current execution state during execution of the first and second software layers; and wherein the called execution-state-transition routine is to determine based on the specified execution state, the return pointer, and the current execution state retrieved from the callpoint log whether the transition to the specified execution state is allowed, wherein determining whether the transition to the specified execution state is allowed comprises accessing an allowed-transitions table to determine if any entry exists in the allowed-transitions table that corresponds to a combination of the specified execution state, the return pointer, and the current execution state retrieved from the callpoint log.

24. The computer system of claim 23 wherein the return pointer is an address of an instruction in the second software layer at which execution resumes following completion of the execution-state-transition routine.

25. The computer system of claim 23 wherein the callpoint log is a first-in, last-out memory stack maintained by the first software layer onto which execution states are pushed and from which execution states are popped by execution-state-transition routines.

26. A computer system comprising:

a computer-readable storage medium storing a first software layer and a second software layer, the first software layer having an execution-state-transition routine callable by the second software layer, both the first and second software layers executable within the computer system as components of the computer system, the first and second software layers comprising:

a set of computer instructions that implement first-software-layer logic;

a set of computer instructions that implement second-software-layer logic;

wherein a call by the second software layer to the execution-state-transition routine specifies a transition to a specified execution state and indicates an execution resumption point within the second software layer by passing to the execution-state-transition routine a return pointer;

wherein the computer-readable storage medium further stores a callpoint log maintained by the first software layer to track a current execution state during execution of the first and second software layers; and wherein the called execution-state-transition routine is to determine based on the specified execution state, the return pointer, and the current execution state retrieved from the callpoint log whether the transition to the specified execution state is allowed, an allowed-transitions table, maintained by the first software layer, that includes entries that specify allowed execution-state transitions and execution resumption points for calls to the execution-state-transition routine, wherein determining whether the transition to the specified execution state is allowed comprises accessing the allowed-transitions table to determine if an entry exists in the allowed-transitions table that corresponds to a combination of the specified execution state, the return pointer, and the current execution state retrieved from the callpoint log.

27. A computer system comprising:

a computer-readable storage medium storing a first software layer and a second software layer, wherein the first software layer and second software layer are executable within the computer system as components of the computer system;

wherein calls are inserted into the second software layer to one or more execution-state-transition routines, wherein the calls each specifies a transition and each indicates an execution resumption point within the second software layer to the execution-state-transition routine by passing to the execution-state-transition routine a return pointer;

wherein the computer-readable storage medium further stores a callpoint log to track a cumulative execution state during execution of the first and second software layers;

wherein a first software layer routine is to determine, for each attempt to access the first software layer routine, whether the cumulative execution state is compatible with execution of the first software layer routine; and wherein the first software layer is to maintain an allowed-calls table including entries that specify:
the first software layer routine to be called;
an authorized execution resumption point for the call to the first software layer routine; and
a cumulative execution state needed for the call to the first software layer routine to proceed.

* * * * *